(12) United States Patent
Rembos et al.

(10) Patent No.: US 8,333,389 B2
(45) Date of Patent: Dec. 18, 2012

(54) WHEELCHAIR STAIR ASSIST APPARATUS

(75) Inventors: Steven Rembos, Hinsdale, IL (US); Rick Guindon, Brookfield, WI (US); Kenneth Muderlak, Milwaukee, WI (US); Todd J. Muderlak, Whitefish Bay, WI (US)

(73) Assignee: Steven Rembos, Hinsdale, IL (US)

( * ) Notice: Subject to any disclaimer, the term of this patent is extended or adjusted under 35 U.S.C. 154(b) by 0 days.

(21) Appl. No.: 13/170,416

(22) Filed: Jun. 28, 2011

(65) Prior Publication Data

US 2011/0254237 A1 Oct. 20, 2011

Related U.S. Application Data

(63) Continuation of application No. 11/857,789, filed on Sep. 19, 2007, now Pat. No. 7,988,157.

(60) Provisional application No. 60/826,093, filed on Sep. 19, 2006.

(51) Int. Cl.
*B62B 5/02* (2006.01)
*B62B 9/02* (2006.01)
*B62D 55/00* (2006.01)
*B62D 55/02* (2006.01)

(52) U.S. Cl. ............. 280/5.22; 180/9.34; 180/9.22; 180/9

(58) Field of Classification Search ............ 180/9, 9.22, 180/9.34; 280/5.22
See application file for complete search history.

(56) References Cited

U.S. PATENT DOCUMENTS

| | | |
|---|---|---|
| 2,243,915 A | 6/1941 | Mueller |
| 3,111,331 A | 11/1963 | Locke |
| 3,146,841 A | 9/1964 | Locke |
| 3,149,688 A | 9/1964 | Russell |
| 3,231,290 A | 1/1966 | Weyer |
| 3,276,531 A | 10/1966 | Hale et al. |
| 3,823,790 A | 7/1974 | Richison |
| 4,027,889 A * | 6/1977 | Krofchalk et al. ........... 280/5.22 |
| 4,044,850 A | 8/1977 | Winsor |
| 4,401,178 A * | 8/1983 | Studer ........................... 180/8.2 |

(Continued)

FOREIGN PATENT DOCUMENTS

DE 3328807 A1 * 2/1985

(Continued)

OTHER PUBLICATIONS

International Preliminary Report on Patentability; International Application No. PCT/US2007/078905; Apr. 2, 2009; 10 pgs.

(Continued)

*Primary Examiner* — Lesley D Morris
*Assistant Examiner* — Daniel Yeagley
(74) *Attorney, Agent, or Firm* — Whyte Hirschboeck Dudek S.C.

(57) ABSTRACT

An apparatus is disclosed for use on standard or customized wheelchairs for moving the wheelchair and wheelchair occupant up or down a stairway or stairway-like structure (e.g., a curb) with greater confidence and stability to the occupant of the wheelchair and its handler(s). The apparatus includes a motorized assembly that interacts with stair steps when the apparatus and wheelchair are tilted backwardly. The motorized assembly allows the wheelchair to glide or move up or down the steps without experiencing the bumps commonly associated with rolling a wheelchair up or down a set of stairs. The apparatus includes a headrest to provide comfort to the occupant during operation and includes pivoting handlebars to allow the operator of the wheelchair to control the movement of the wheelchair. The apparatus is mountable to, and removable from (when not in use), the wheelchair. The apparatus can be considered as a retrofit.

15 Claims, 16 Drawing Sheets

U.S. PATENT DOCUMENTS

| | | | |
|---|---|---|---|
| 4,566,551 A | | 1/1986 | Feliz |
| 4,566,706 A | | 1/1986 | Bihler et al. |
| 4,898,256 A | * | 2/1990 | Lehner ............... 180/8.2 |
| 4,962,941 A | | 10/1990 | Rembos |
| 5,141,240 A | | 8/1992 | Heilig |
| 5,158,309 A | | 10/1992 | Quigg |
| 5,179,746 A | * | 1/1993 | Rogers ................ 5/625 |
| 5,390,389 A | | 2/1995 | Rutkowski et al. |
| 5,421,693 A | | 6/1995 | Petersen |
| 5,944,338 A | | 8/1999 | Simpson |
| 6,123,162 A | * | 9/2000 | Rodriguez et al. ....... 180/8.3 |
| 6,158,536 A | * | 12/2000 | Misawa ............... 180/9.32 |
| 6,478,529 B1 | | 11/2002 | Willey et al. |
| 2006/0038360 A1 | * | 2/2006 | Negishi ............... 280/5.2 |
| 2006/0076739 A1 | * | 4/2006 | Kikusato ............. 280/5.22 |
| 2008/0067762 A1 | | 3/2008 | Rembos |

FOREIGN PATENT DOCUMENTS

| | | | |
|---|---|---|---|
| DE | 3913079 A1 | * | 10/1990 |
| DE | 10210617 | | 7/2003 |
| DE | 102004043778 A1 | * | 4/2005 |
| DE | 102005052790 | | 5/2006 |
| DE | 102005052790 A1 | * | 5/2006 |
| EP | 1616545 A | | 1/2006 |

OTHER PUBLICATIONS

Alber Simply Mobile; Scalamobil IQ—Mobile Stair Climber; www.alber.de; 2006; Germany; 8 pgs.

Stair-Trac—Portable Wheelchair Lift; Garaventa Accessibilty; www.garaventa.ca; 2004; Canada; 2 pgs.

Super-Trac—Portable Inclined Platform Wheelchair Lifts for Stairways; www.garaventa.ca; 2003; Canada; 4 pgs.

Stair Robot—Industrial Stair Climbing Devices; AVTA International; www.stair-robot.co.uk; 2005; Great Britain; 7 pgs.

* cited by examiner

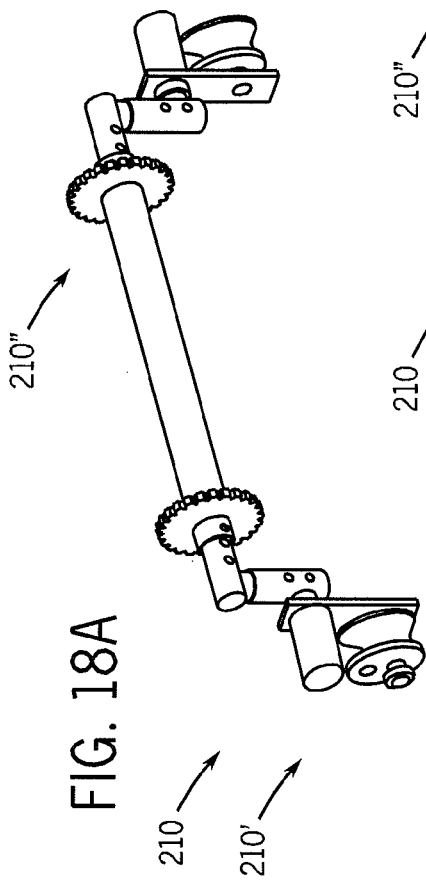
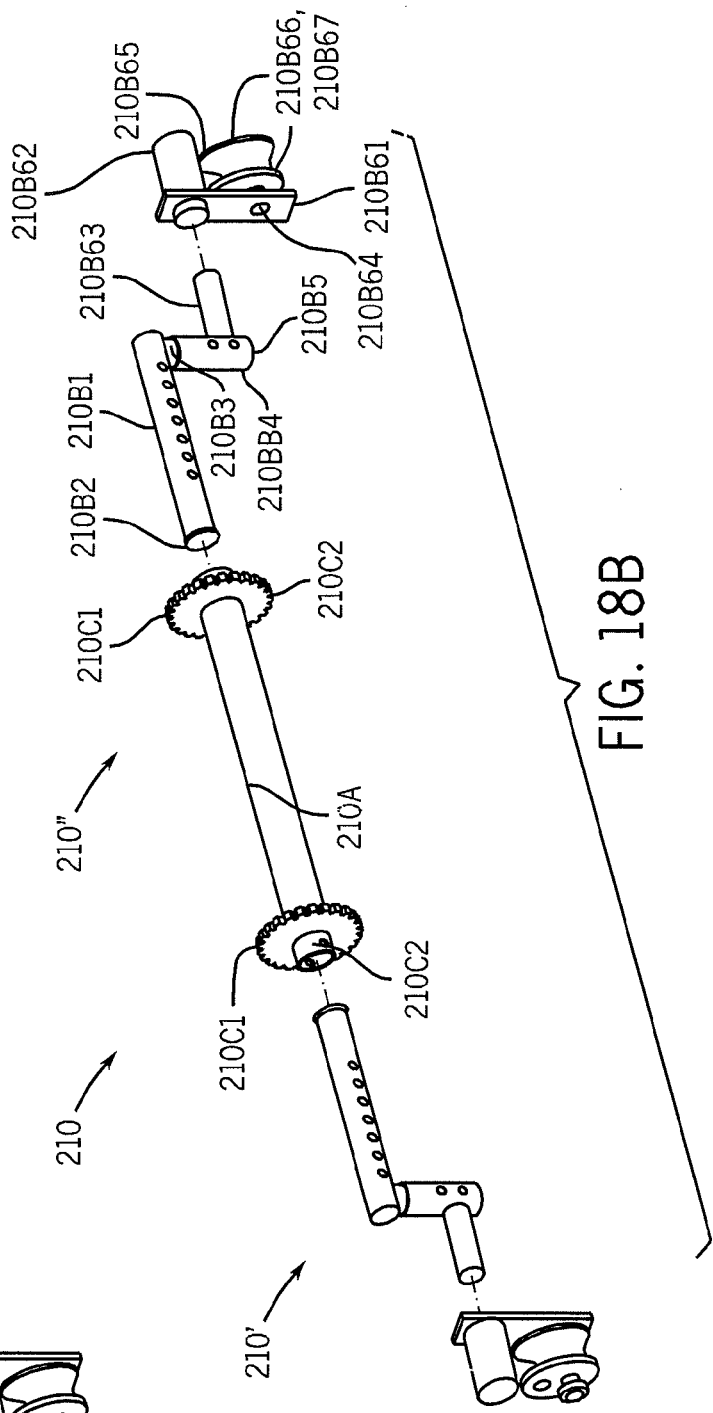

WHEELCHAIR STAIR ASSIST APPARATUS

CROSS-REFERENCE TO RELATED APPLICATION

This application claims priority under 35 U.S.C. §1.19(e) to Provisional Patent Application Ser. No. 60/826,093, which was filed on Sep. 19, 2006, and patent application Ser. No. 11/857,789, which was filed on Sep. 19, 2007, the entire disclosures of which are incorporated by reference herein.

FIELD OF THE INVENTION

This invention relates in general to the field of medical devices and apparatus and in particular to a wheelchair stair assist apparatus for assisting the wheelchair and occupant thereof to ascend and/or descend a stairway or stairway-like structure, such as a curb.

BACKGROUND OF THE INVENTION

Conventional wheelchairs have two large rear wheels rotatably mounted beneath a vertical side frame member and two caster wheels mounted to a rail or fork on the front of the wheelchair assembly. Conventional wheelchairs as presently manufactured cannot provide for safe and "hump free" use by an occupant of the wheelchair to ascend or descend stairways. In order for a standard design wheelchair to be used in the transporting of an occupant up or down a stairway, the wheelchair must be tipped backward, with the occupant in it, by a handler or attendant of the wheelchair and then slowly lowered or raised, one step at a time on the stairway. Safe practice generally requires that a second attendant should grasp the front caster wheels or frame of the wheelchair and walk with the wheelchair as the occupant and wheelchair are raised or lowered on a stairway. Due to the size of the rear wheel, the wheelchair must be slowly lifted or lowered one stair at a time and in a manner that causes the occupant to be jolted or bumped as the wheels pass to the next step. This can, in extreme circumstances, lead to a total loss of control, resulting in a "free fall" situation for the occupant and/or the handler. In other circumstances, this can lead to anxiety and severe discomfort, particularly to older occupants of the wheelchair as well as individuals and persons suffering from injury or other trauma. And this can cause damage to the wheelchair as well. Further, using the wheelchair to ascend or descend a stairway is time consuming and places the occupant and handler at risk of injury due to the difficulty of a handler to control the wheelchair on the stairway, particularly on any stairway. Also, the handler must bend over the wheelchair at an uncomfortable angle when the wheelchair is tipped backwards on the stairwell. This leads to an uncomfortable experience for the handler, who must ensure that the wheelchair is lifted up and outward to clear a riser when ascending, as well as an increased risk to the safety of the wheelchair occupant and the handler.

Many wheelchair-bound persons, due to the difficulty of ascending or descending stairways and curbs, are prevented from gaining access to buildings and to the upper levels of multi-story buildings. Not only does this affect their mobility, but it also affects their ability to gain employment since many employers do not want to cope with a wheelchair-bound employee who cannot freely move from one floor to another in a place of employment. Also, hospitals, nursing homes and other multi-story patient care facilities must rely on elevators to move wheelchair-bound patients from one floor to another due to the difficulty of negotiating a stairway. Medical transport services that often transport sick, invalid, obese, or elderly patients have difficulty in transporting such patients in a wheelchair. Extreme difficulties have been encountered in the patients' homes where the wheelchair-bound person must be raised and lowered along a narrow stairwell. In many cases this prevents such a person from utilizing his or her whole house and forces him or her to live on only one floor of a multi-story dwelling.

Additionally, during a fire situation or other hazard when the elevators of most hospitals, nursing homes, and other multi-story buildings are shut down, residents are required to use stairways to exit the building. In so doing, particularly for wheelchair-bound invalids, there is a risk of injury, and great delay in removing them from the building in a safe and efficient manner. Such a delay also affects the ability of other building occupants to exit the building quickly and safely thereby increasing the risk of an overall panic where people are needlessly injured or killed. Current fire escape plans for many of these buildings involve placing a wheelchair-bound patient in a blanket and having four people, each carrying a corner of the blanket, remove the patient from the building. This method depends on the availability of four people strong enough to carry such a patient while ignoring the possible need for life sustaining equipment to be carried along with the patient. Therefore, the current state of emergency exit plans for most nursing homes and hospitals expose many of the wheelchair-bound and invalid patients to extreme danger in a fire situation.

Attempts have been made in the past to provide a means for ascending or descending stairs in a wheelchair in a manner that would not place the occupant at any risk of harm or jolt the occupant as the wheelchair is raised or lowered up the stairs. For example, some options include attaching a device to a standard wheelchair where: a) the device is permanently attached; b) the device is heavy and/or cumbersome to manufacture; and/or c) the device is expensive to own. Some other options provide for a special wheelchair equipped for ascending/descending stairs. Such wheelchairs are usually expensive to manufacture and conventional wheelchairs have to be replaced by such specialized wheelchairs to be able to take advantage of the stairway ascending/descending feature. Yet other options restrict the movement of the wheelchair both when the apparatus is in use and not in use. Frequently, all the above-indicated options require manual handling/control of the wheelchair by a handler to assist in moving the wheelchair up and/or down the stairs.

As is already evident, most conventional options for wheelchairs in assisting movement up or down a set of stairs have numerous disadvantages and problems. It would, therefore, be advantageous if an apparatus is developed, that while overcoming some, or all of the disadvantages and risks of the conventional options, also provides additional advantages. For example, instead of having the handler control the rate of ascent/descent, an apparatus that includes a motorized mechanism to move the wheelchair and occupant up and down the stairs would be beneficial. It would further be advantageous to provide a lightweight, easily-manufactured and affordable wheelchair apparatus capable of fitting to a wheelchair of a standard design for providing a safe and smooth means by which the wheelchair and occupant thereof can be raised or lowered on the stairway.

It would additionally be advantageous if an apparatus that is removably affixed to the wheelchair such that the apparatus can be removed from the wheelchair and conveniently stored if desired is developed. Such an apparatus would further provide an independent means of control not directly linked to the wheelchair handlebars for avoiding interference with the operation of the chair both when the apparatus is in use and not in use. Further, attaching such an apparatus to a wheelchair (or any other chair) would not interfere with the normal functioning of the wheelchair, allowing the wheelchair to function just as it would without the apparatus attached.

SUMMARY OF THE INVENTION

The present invention is directed to a wheelchair apparatus that may be assembled on a new wheelchair or a conventional wheelchair that is presently or has been previously manufactured. Additionally, the present invention can be attached to any other type of a chair, with or without wheels, for moving the chair and occupant thereof up and/or down stairs. The present invention entails a minimum of modifications, or possibly even no modifications, to the standard chair and as such may be added either as a kit to an existing wheelchair that has already been purchased by a user, or may be added as an accessory by a manufacturer of wheelchairs.

The subject invention meets the objects as expressed herein as the apparatus is easily attachable and detachable to a standard wheelchair with a minimum of modification, or possibly even no modifications, to the chair. Further, when properly used, the subject invention provides a means by which a wheelchair-bound person may be raised or lowered along a stairway with greater confidence and in an efficient manner. Further, the subject invention does not restrict the normal movement of the chair when the device is either in use or not in use. Additionally, the apparatus can easily be removed for collapsing the wheelchair for storage. The subject invention provides a means by which an occupant of the chair may be raised or lowered on a stairway without suffering the "jolts" or "bumps", or risks, commonly experienced with the present methods of raising or lowering a person on a stairway.

This invention provides an apparatus for assisting a wheelchair and an occupant thereof to ascend or descend a stairway or stairway-like structure. To this end the apparatus comprises a housing that is securable to a wheelchair. In addition, a motorized assembly securable within or substantially within the housing is provided for automatically moving the wheelchair up or down the stairway or stairway-like structure. Also provided is an attachment mechanism for securing the housing and the motorized assembly to the wheelchair, thereby preventing the apparatus from separating from the wheelchair. Other features, objects, and advantages of the present invention, in its various embodiments, will become apparent upon a reading and review of the detailed description, including the claims, and the drawings.

BRIEF DESCRIPTION OF THE DRAWINGS

Features of the present invention which are believed to be novel are set forth with particularity in the appended claims. Embodiments of the invention are disclosed with reference to the accompanying drawings and these embodiments are provided for illustrative purposes only. The invention is not limited in its application to the details of construction or the arrangement of the components illustrated in the drawings. Rather, the invention is capable of other embodiments and/or of being practiced or carried out in other various ways. The drawings illustrate a best mode presently contemplated for carrying out the invention. Like reference numerals are used to indicate like components. In the drawings:

FIGS. 18A-B are side perspective and exploded side perspective views, respectively, of an exemplary bottom chair attachment assembly of the apparatus in accordance with at least some embodiments of the invention.

DETAILED DESCRIPTION

Figure 1:
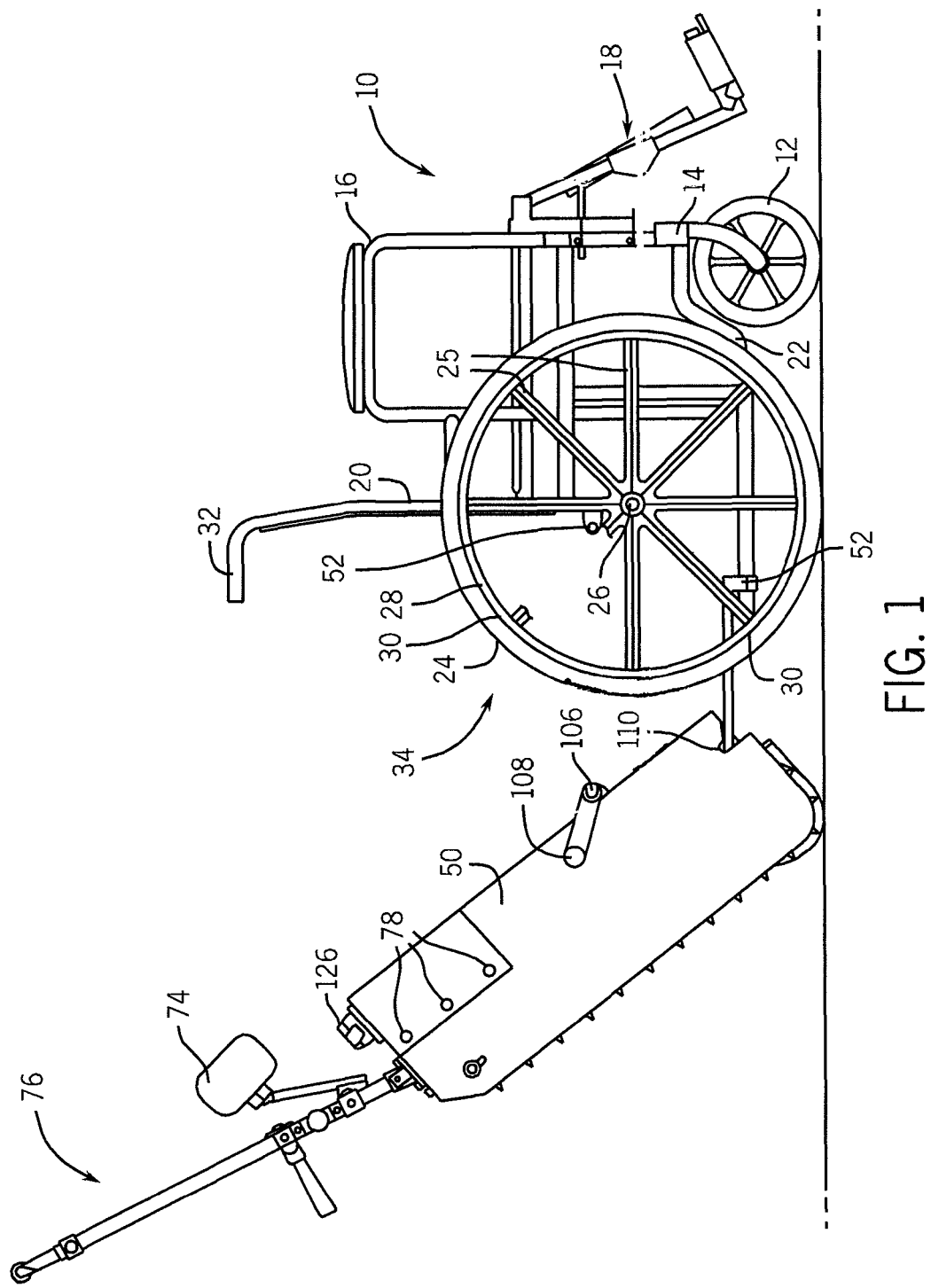
FIG. 1 is a side view of the improved wheelchair apparatus used to move a wheelchair and occupant up and down stairs and curbs.

The invention described herein can be implemented on wheelchairs of various types. For purposes of clarity and simplicity, and for teaching purposes, and not by way of limitation, the invention is shown and described as applied to a standard type wheelchair as shown in FIG. 1. As illustrated in FIG. 1, the standard wheelchair, generally referenced by numeral 10, has front caster wheels 12 connected to front forks 14 which forms a part of wheelchair arms 16. Also connected to front forks 14 are the footrest assemblies 18. The rear side frame 20 of the chair 10 has front rail 22 connected to the vertical member of side frame 20. Large rear wheels 24 are rotatably connected at axle 26 to the rear side frame 20. Large rear wheels 24 have hand rail 28 connected thereto by virtue of a series of spacers and clips 30 and spokes 25 mounted between wheel 24 and axle 26. The spacers provide the necessary distance between rear wheel 24 and hand rail 28 so that an occupant of the chair can self-motivate himself by using the handrail to roll the large rear wheels 24 of chair 10. Arm rests 16 may or may not be removable depending on the type and manufacture of the chair 10. Also formed along side rear side frame 20 are handlebars 32. These handlebars 32 are normally what an attendant or handler of the chair 10 would grip to assist an occupant of the chair 10 in moving the chair 10 from one place to another.

Figure 2:
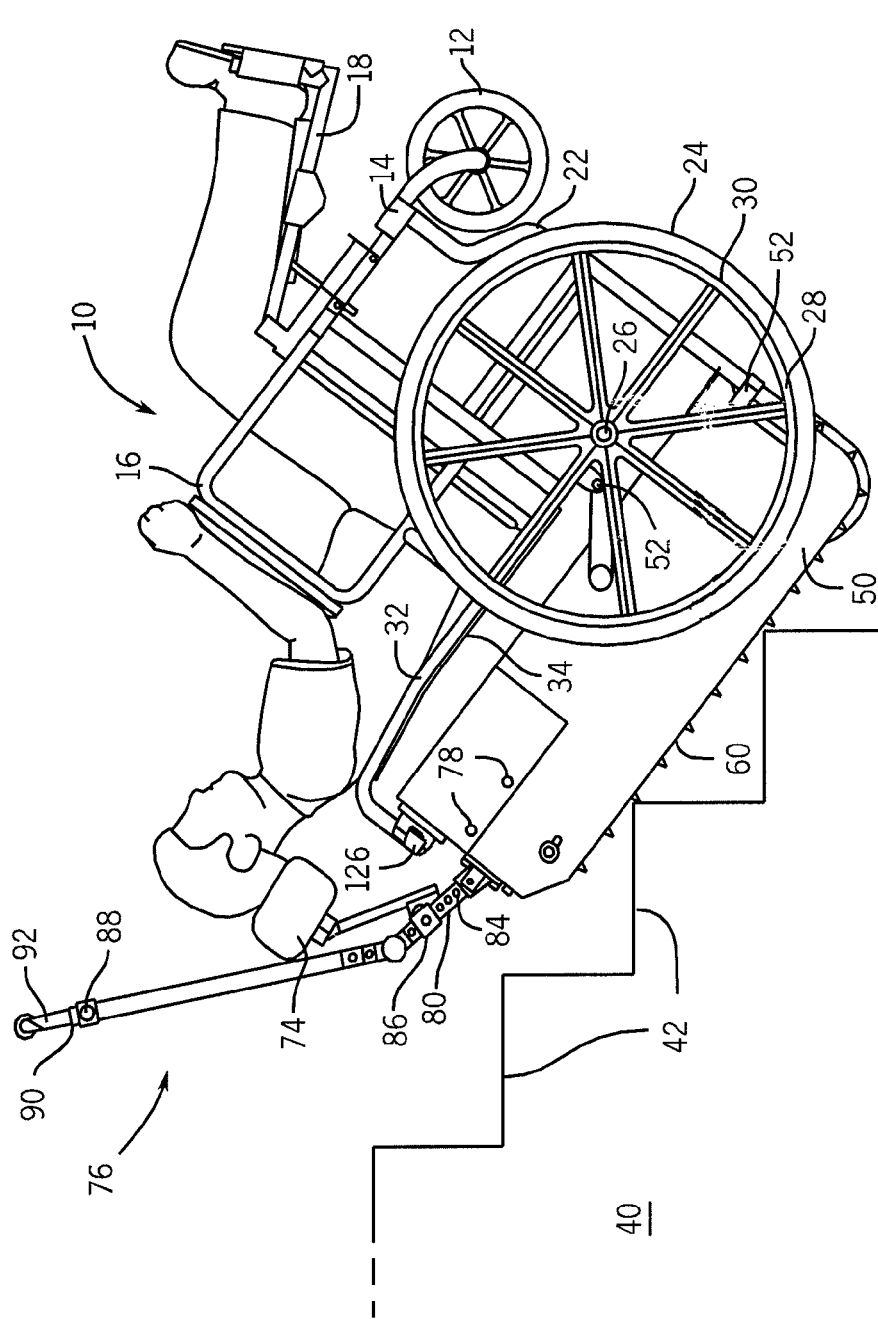
FIG. 2 illustrates the apparatus secured to the wheelchair having an occupant and raising or lowering the wheelchair up or down stairs.

The present invention is shown in FIG. 1 and is shown attached to the chair 10 in FIG. 2. The invention comprises an apparatus 50 that includes a motorized track assembly 60 that automatically moves the wheelchair 10 up or down stairs. The apparatus 50 mounts to the rear portion 34 of the wheelchair 10 by locking onto clamping pins 52 that are secured to the wheelchair 10 (explained in greater detail below).

Illustrated in FIG. 2 the apparatus 50 is secured to the wheelchair 10 and is adjacent to a stairwell 40. The motorized track assembly 60 is illustrated engaging the stair steps 42 of the stair well 40 such that the approximate length of the motorized track assembly 60 is shown with respect to the individual stair steps 42.

Figure 3:
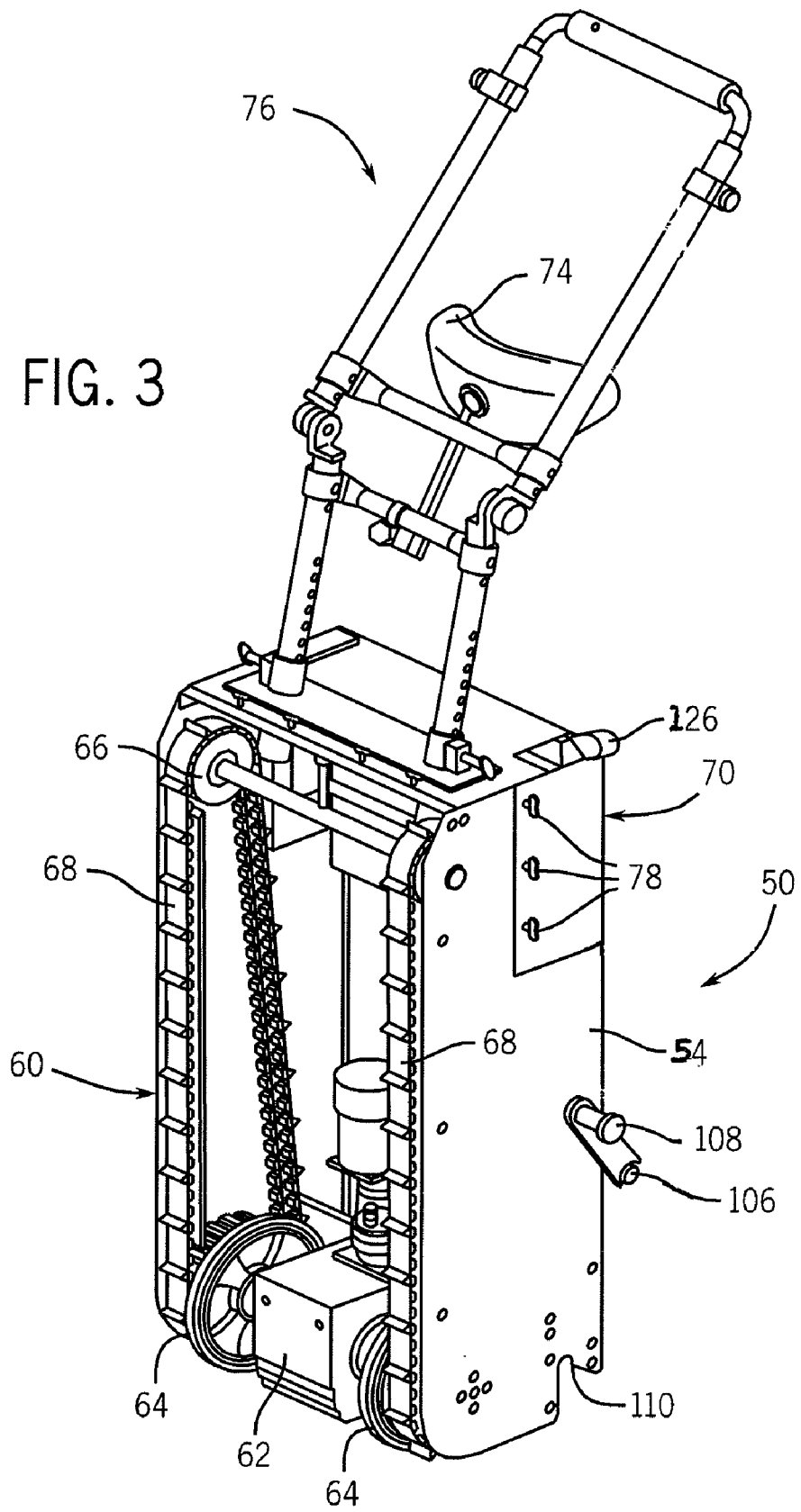
FIG. 3 is a rear perspective view of the apparatus partially showing the internal mechanisms of the apparatus.
Figure 4:
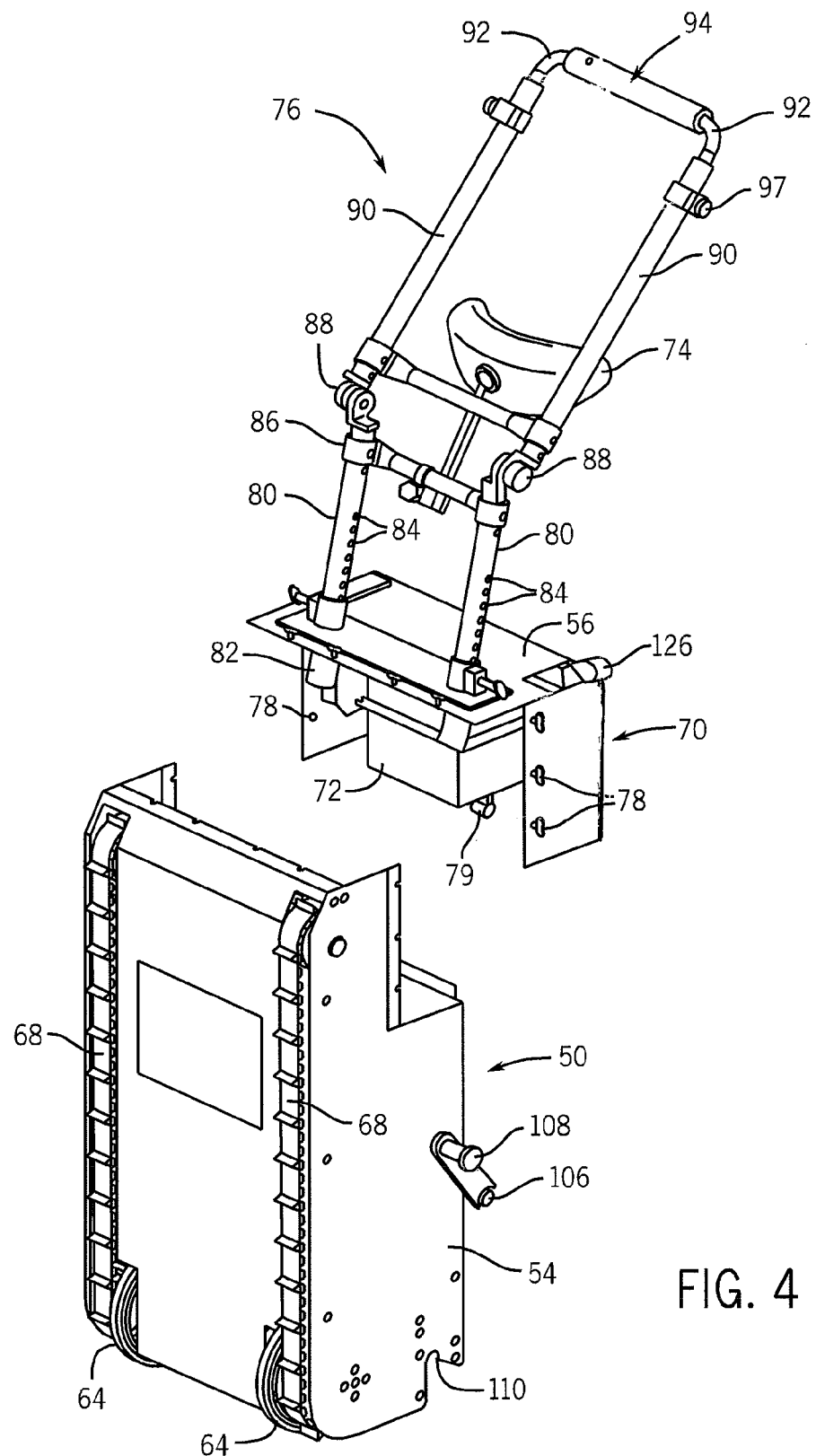
FIG. 4 is a rear perspective view of the apparatus illustrating the removal of a detachable assembly.

FIGS. 3 and 4 illustrate the back view of the apparatus 50. The motorized track assembly 60 is secured within a housing 54 defined by the apparatus 50. The motorized track assembly 60 is controlled by a motorized drive 62 that rotates a pair of lower track wheels 64. A pair of upper track wheels 66 is freely rotatably attached inside the housing 54. Over the rollers is placed a tread 68 such that the tread is able to move in a continuous motion around the wheels as the wheelchair 10 is raised or lowered along a stairway 40. The tread 68 is comprised of a grooved rubber-like material for traction and gripping the stairway 40. This allows the motorized track assembly 60 to rest on two outer edges of the stair steps 42 at a time and thus prevents the bumping of the rear wheel 24 as the wheelchair 10 is raised or lowered along the stairway. The apparatus 50, when attached to the wheelchair 10 the outer edge of the tread 68, is approximately tangent to the rear wheel 24 so that the tread 68 will engage the stair steps 42 as the wheelchair 10 is raised or lowered along the stairway. By "approximately tangent to the rear wheel 24," it is meant that the outer edge of the tread 68 lines up with the outer edge of the rear wheel 24 as shown in FIG. 2.

The apparatus 50 includes a detachable assembly 70, that stores the battery pack 72 and control mechanism (not shown) as well as includes a headrest 74 and pivoting handle bars 76. The detachable assembly 70 is easily removed and attached to the apparatus 50 with the use of a plurality of locking mechanisms 78 (well known in the art) positioned on both sides, the top portion and the front portion of the detachable assembly 70. The battery pack 72 disconnects from the motorized drive by uncoupling an electrical connector 79, shown below the battery pack 72 on FIG. 4. Alternatively, a removable battery pack 72 capable of being attached to the detachable assembly 70 can be used.

Figure 5:
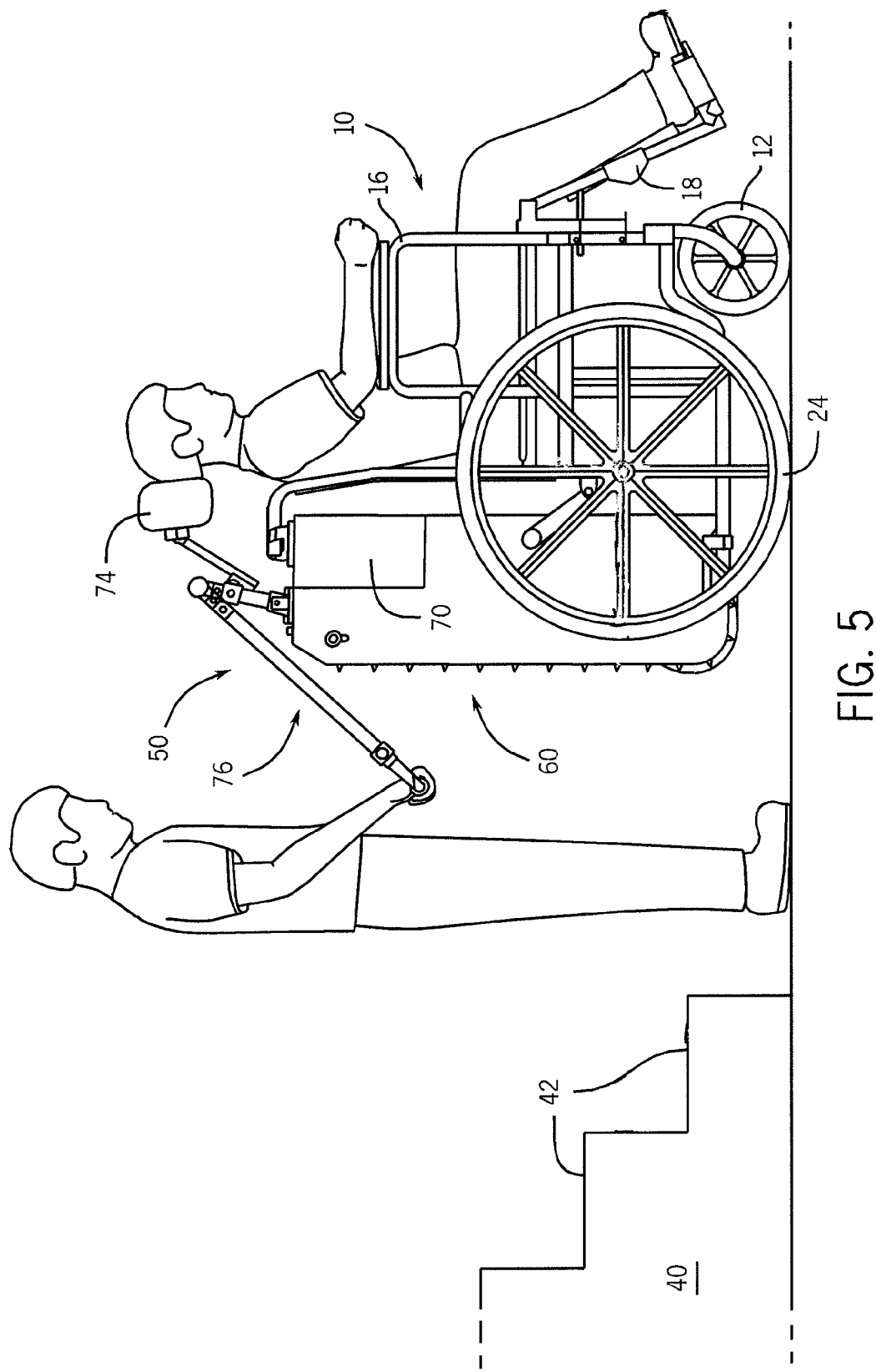
FIG. 5 is a side view of the apparatus attached to the wheelchair having an occupant, and the wheelchair being operated by a user moving the apparatus to engage stairs.

Referring now to FIG. 5, it is shown that the apparatus 50 does not interfere with the wheelchair 10 when it is attached thereto. As illustrated throughout the Figures, the handlebars 76 which an operator of the apparatus may grasp during use are adjustable and pivotable. Referring to FIG. 4 in conjunction with FIG. 5, the handlebars 76 are secured to a top portion 56 of the housing 54. The handlebars 76 consist of a first pair of bars 80 that extend through slots 82 mounted on top portion 56 of the housing 54. Various notches 84 positioned on the first pair of bars 80 permit the first pair of bars 80 to be lowered or raised to a desired height. Secured across the first pair of bars 80 is a cross bar 86 to which the adjustable headrest 74 is attached. The first pair of bars 80 is connected via a pivotal connection 88 to a second pair of bars 90. The pivotal connection 88 may consist of two interlocking detent plates that when the two plates are loosened the second pair of bars 90 may be pivoted to a desired location. The second pair of bars 90 are hollowed to receive a third pair of bars 92 that includes a handle 94 secured transversely across the end of the third pair of bars 92. The third pair of bars 92 includes notches (not shown) for locking the third pair of bars 92 in at a desired height (FIG. 2) with locking pins 97. The locking pins 97 may be spring-loaded pins that are biased inwardly through the second pair of bars 90 to engage the notches of the third pair of bars 92.

Figure 6:
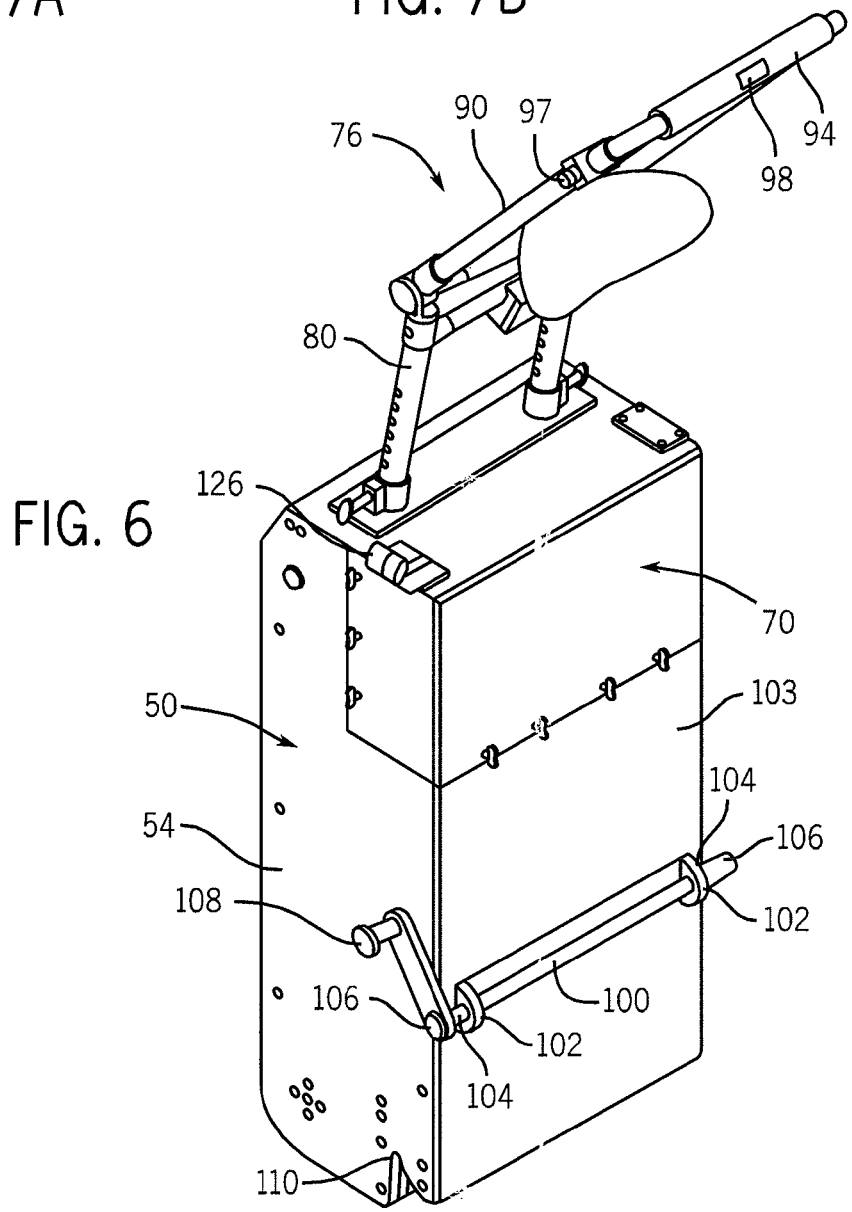
FIG. 6 is a front perspective view of the apparatus.

Referring now to FIG. 6, the front of the apparatus is illustrated. As shown, the apparatus may be turned on and operated using a switch 98 located on the handle 94. Preferably, the switch 98 toggles the direction of the apparatus and the movement of the tread 68. When the switch 98 is moved to the "up" position, the tread 68 is capable of moving the apparatus, and therefore the wheelchair to which it is attached, up the stairs. Alternatively, when the switch 98 is moved to the "down" position, the tread 68 is similarly capable of moving the wheelchair 10 down the stairs. To prevent the apparatus 50 from moving the wheel chair 10 unattended by the user, as soon as the user releases the switch 98, the switch toggles back to a neutral center position and the apparatus is automatically switched off. Also illustrated more clearly in FIG. 6 are the means through which the apparatus 50 is secured to the wheelchair 10. The apparatus 50 includes a rotating bar 100 that is secured through a pair of plates 102 that suspend the rotating bar 100 away from the front portion 103 of the apparatus 50.

Figure 7A:
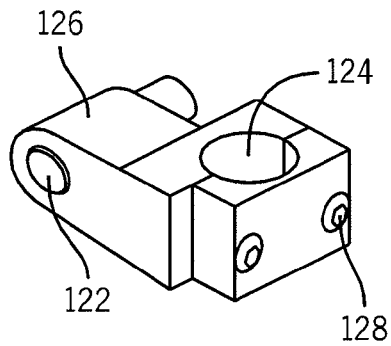
FIGS. 7a and 7b are front perspective views of mechanisms used to secure the apparatus to the wheelchair.
Figure 7B:
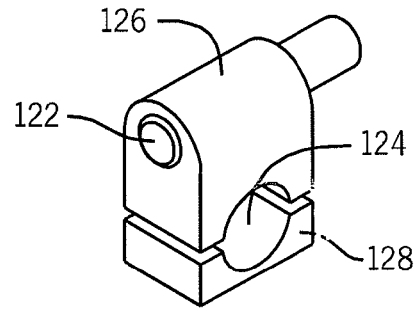

With reference to FIGS. 2, 7A and 7B, fastened to both ends of the rotating bar 100 are end caps 104 that include U-shaped notches 106, which engage pins 122 on first pair of clamping pins 52. Similarly, the lower front portion of the apparatus includes U-shaped notches 110 that also engage pins 122 on a second set of clamping pins 52. To lock the apparatus 50 against the wheelchair 10, the four clamping pins 52, including the first and the second sets, are engaged and the operator rotates a crank handle 108 that is attached to the rotating bar 100. The crank handle 108 rotates the U-shaped notches 106 on the end caps 104 of the rotating bar 100 away from the wheelchair 10, such that the apparatus 50 is secured to the wheelchair 10, preventing the apparatus from accidentally disengaging. The clamping pins 52 include pins 122 for engagement by the apparatus 50. The clamping pins 52 also include an aperture 124 formed when two pieces 126 and 128 defined by the clamping pins are assembled. The aperture 124 is sized to receive either the front rail 22 or the rear side frame 20 of the wheelchair 10. To further secure the apparatus 50 to the wheelchair 10, the apparatus 50 can include straps (not shown) that secure around the wheelchair's handlebars 32 as metal clips and/or plates 126.

Figure 8:
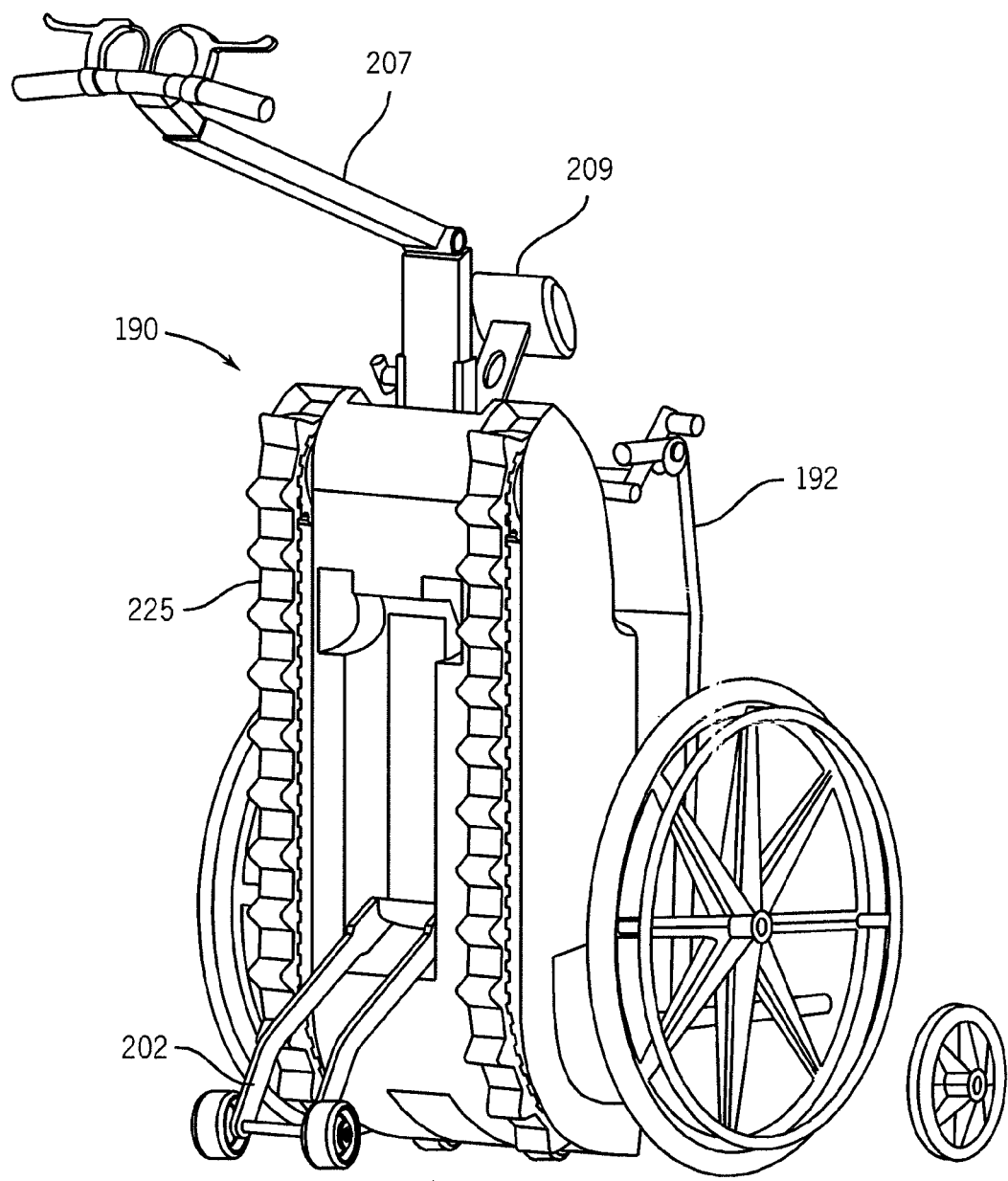
FIG. 8 is a rear perspective view of an apparatus secured to a wheelchair in accordance with at least some alternate embodiments of the invention, partially illustrating some internal mechanisms of the apparatus.
Figure 9:
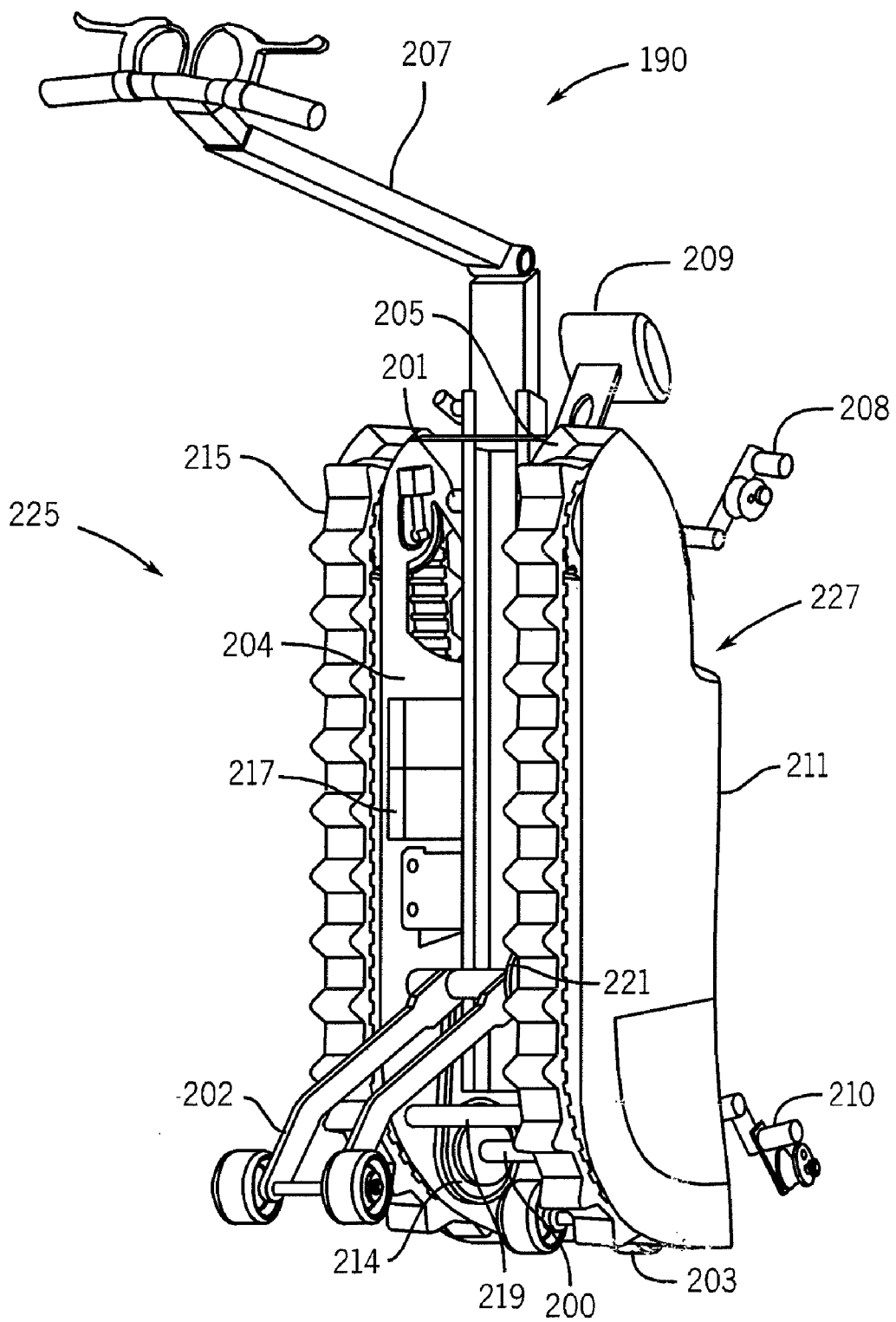
FIG. 9 is a rear perspective view of the apparatus of FIG. 8 illustrating a detachable assembly in accordance with at least some embodiments of the invention.
Figure 10:
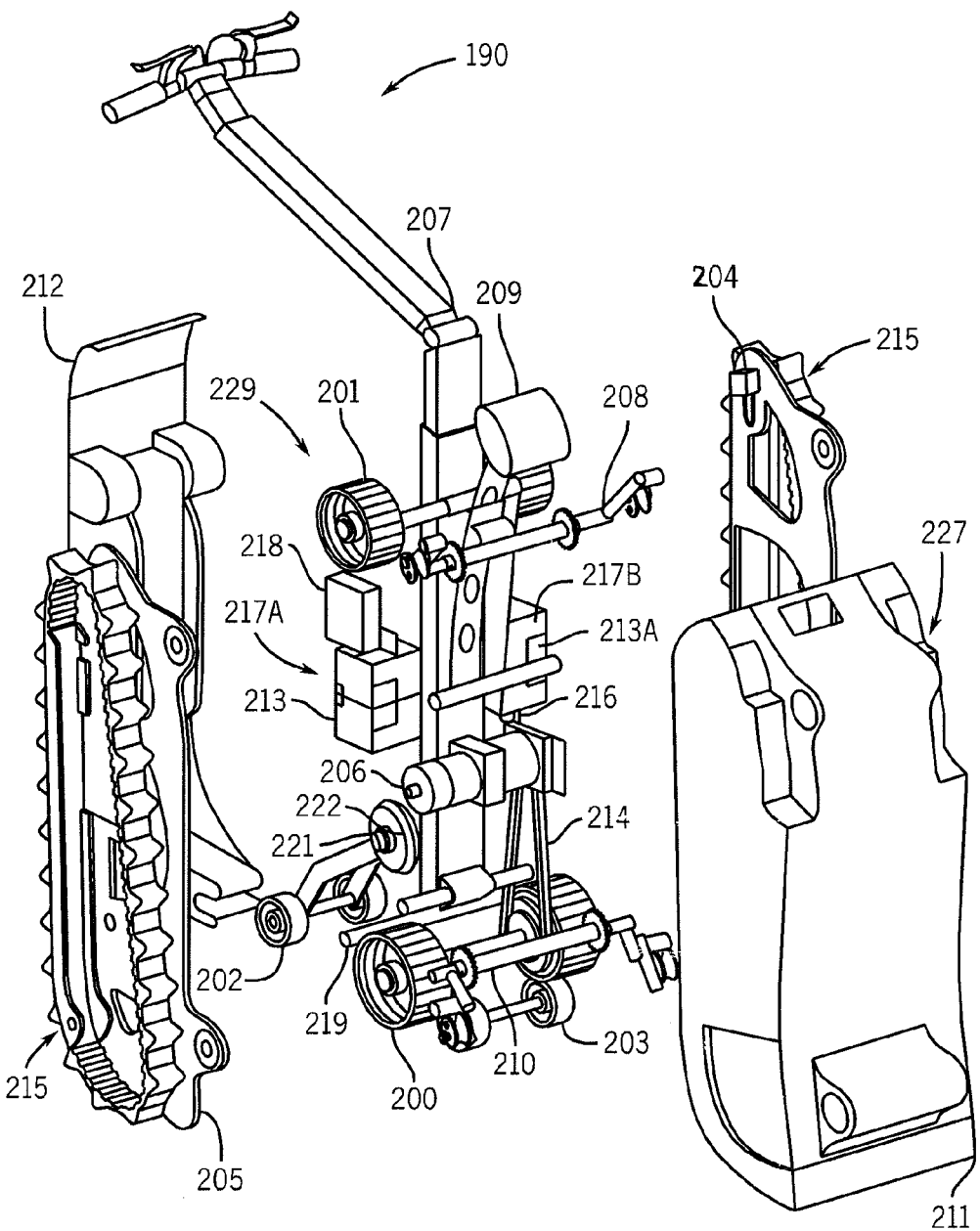
FIG. 10 is an exploded view of the detachable assembly of FIG. 9 showing various assemblies and sub-assemblies of the apparatus connected together in operational association in accordance with at least some embodiments of the invention.

Referring now to FIGS. 8-21, exemplary features and associated components of an apparatus 190 (also referred herein as a stair assist apparatus or a wheelchair apparatus) are shown in accordance with at least some alternate embodiments of the present invention. In particular, FIG. 8 is a rear perspective view of the apparatus 190 secured to a wheelchair 192. FIG. 8 also partially illustrates various internal features of the apparatus 190. FIGS. 9 and 10 illustrate various assemblies and sub-assemblies of the apparatus 190 connected together in operational association with one another and each of the FIGS. 11-21 present views of a number of assemblies, including a body assembly 225, an assist assembly 202, a handlebar assembly 207 and a headrest assembly 209, as well as sub-assemblies of the apparatus 190. Each of the figures is described in greater detail below. The apparatus 190 is contemplated for use in conjunction with a wide variety of wheelchairs, as previously mentioned, that are commonly available and frequently used. As shown in FIG. 8, the apparatus 190 is attached to the rear portion of the wheelchair 192 by way of attachments/mechanisms described later in the application. While the apparatus 190 is shown attached or otherwise connected to the wheelchair 192, it can be understood that the apparatus is easily detachable from the wheelchair. Such detachability is an advantageous aspect of the present invention. For example, by virtue of being detachable, the apparatus 190 can be easily removed from one wheelchair and attached with another. Also, the detachability aspect is beneficial insofar that the apparatus 190 can be easily and conveniently transported from one location to another. Efficient storage is an added bonus. Accordingly, in at least some other embodiments of the present invention, the apparatus can be considered or used as a retrofit.

Referring to FIGS. 9 and 10, which are rear perspective and exploded views of the apparatus 190, respectively, are shown in accordance with at least some embodiments of the present invention. As shown, the various assemblies (e.g., the body assembly 225, the assist assembly 202, the handlebar assembly 207 and the headrest assembly 209), sub-assemblies and components thereof, including a wide variety of electrical and mechanical parts held together in operational association, can be seen in greater detail in FIG. 10. The assemblies are generally contained within a housing 227. The housing 227 further includes a top cover 211, a bottom cover 212. Abutting the housing and more specifically, the top and the bottom covers 211 and 212 respectively of the housing are left and right frame members 204 and 205, respectively. The respective left and the right frame members 204 and 205, described further below, are used for securing the various assemblies in position within the housing 227.

Figure 11:
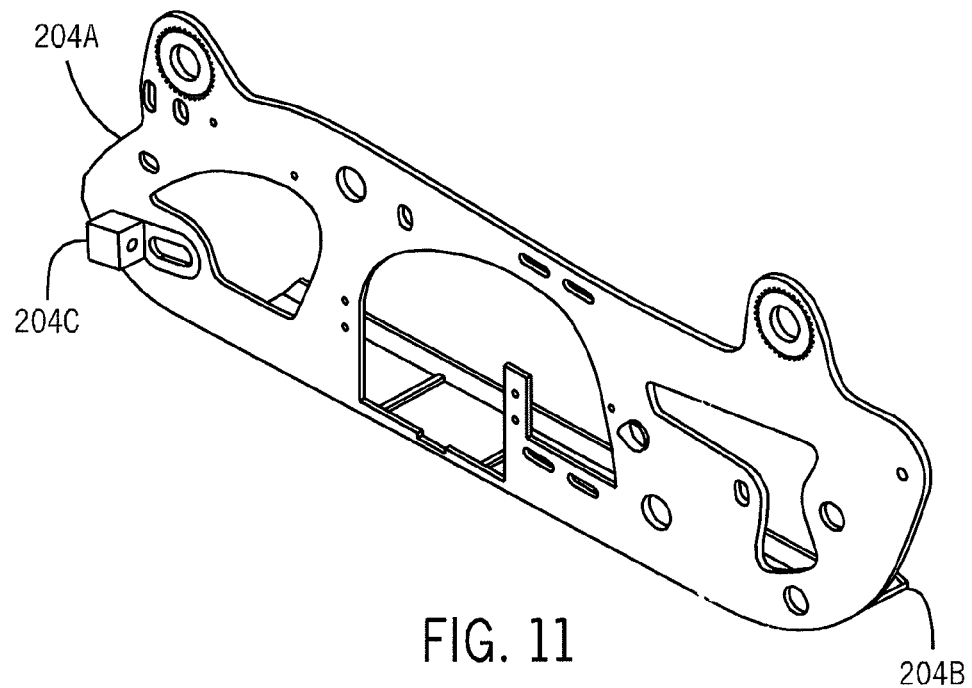
FIG. 11 is a front perspective view of an exemplary frame member (as shown, a left frame member) of the apparatus in accordance with at least some embodiments of the invention.
Figure 12:
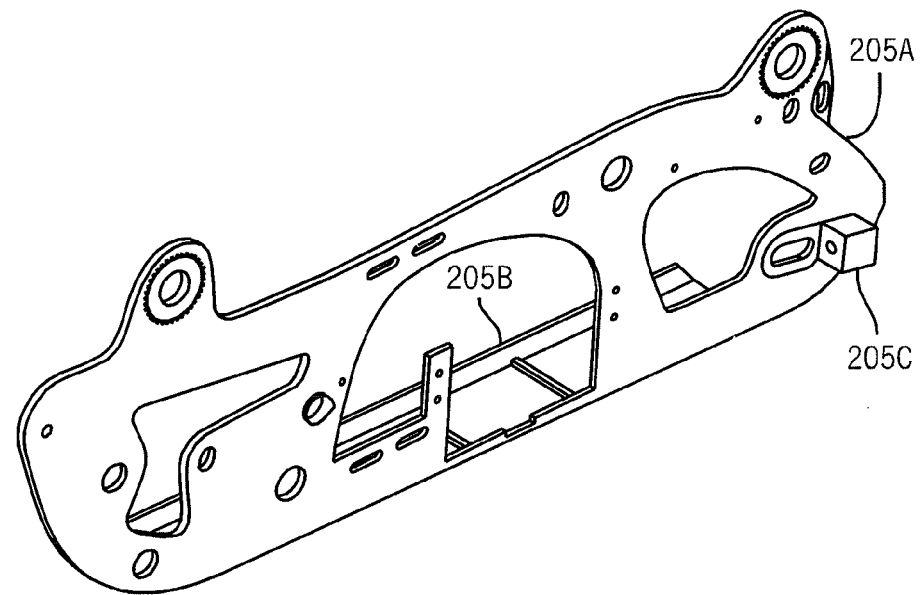
FIG. 12 is a front perspective view of another exemplary frame member (as shown, a right frame member) of the apparatus in accordance with at least some embodiments of the invention.

Turning now to FIGS. 11 and 12, exemplary left and right frame members 204 and 205, respectively are shown in accordance with at least sonic embodiments of the present invention. The size and shape of each of the left and the right frame members mirror each other and at least in this fashion, the frame members are substantially similar. In particular, as shown in FIG. 11, the left frame member 204 includes a main frame 204A defining a number of protrusions and depressions in various shapes and sizes (all of which are not numbered separately) for securing in position the various assemblies of the apparatus 190 and/or components thereof. Also connected to the main frame 204A is a belt guide 204B for rotatably mounting and guiding a motorized belt 215 for transporting the wheelchair 192 and an occupant thereof up and/or down stairs. A belt adjustment block 204C for adjusting the alignment of the belt 215 along the belt guide 204B during operation is also provided on the main frame 204A. Similarly, as shown in FIG. 12, the right side frame 205 includes a main frame 205A, a belt guide 205B and a belt adjustment block 205C accomplishing the same, or at least substantially similar, functions as the components of the left frame member 204.

Turning back to FIGS. 9 and 10, the motorized belt 215 having a plurality of continuous treads further includes first and second belts, referenced generally by the reference numeral 215 (see FIG. 10), mounted on the respective left and the right frames 204 and 205. The motorized belts 215 can be any of a wide variety of belts that are known, however, in general, the motorized belts 215 will provide traction on the stairs during operation. For example, in accordance with at least some embodiments, the motorized belts 215 can comprise rubber belts, and in at least some preferred embodiments, optimal durometer rubber belts can be used. Additionally, a "no mark" rubber can be used to prevent the motorized belt 215 from leaving tread marks on the stairs.

The rotational movement of the motorized belts 215 to accomplish travel up and down a stairwell is provided by a drive assembly 229 (see FIG. 10) connected at least indirectly to the motorized belts. The drive assembly 229 further includes various sub-assemblies. The sub-assemblies include: an electrical box 218 for serving as an end or transition point for a variety of electrical wires within the apparatus 190; a battery pack 217 including first and second batteries 217A and 217B, respectively, mounted in respective battery support brackets 213 and 213A; a drive axle assembly 200; a motor assembly 206; and an idler shaft assembly 201. With respect to the battery pack 217, each of the respective first and the second batteries 217A and 217B within the battery pack can be re-chargeable or replaceable batteries that are mounted to the respective left and the right frame members 204 and 205 through the battery support brackets 213 and 213A, respectively. For example, in the present embodiment each of the first and the second batteries 217A and 217B, respectively, can include two 12 volt batteries. Nonetheless, in other embodiments, other arrangements and configurations can be used. To provide additional support and restrict movement of the batteries within the battery mounting bracket, a plurality of straps for securing the batteries to the frame members can be used.

Figure 13:
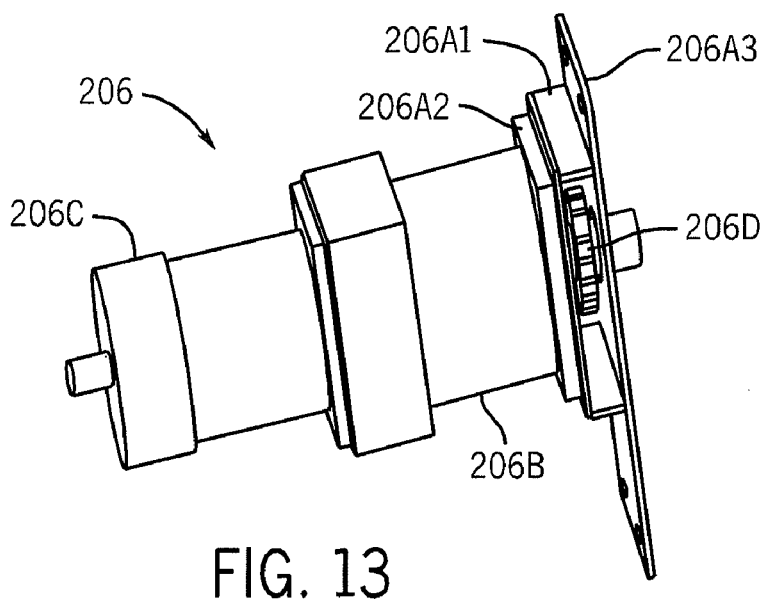
FIG. 13 is a front perspective view of an exemplary motor assembly for use with the apparatus in accordance with at least some embodiments of the invention.
Figure 20:
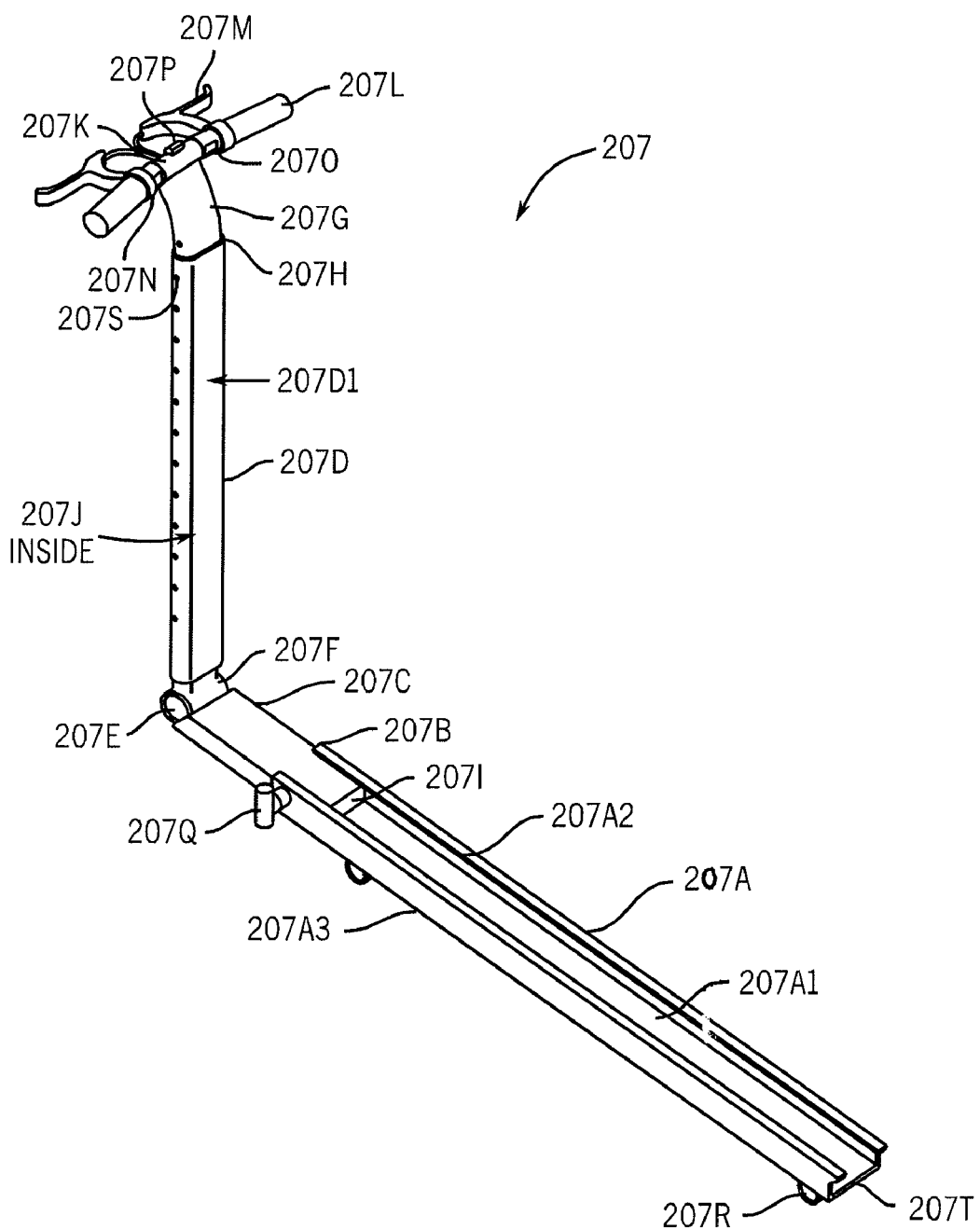
FIG. 20 is a side perspective view of an exemplary handle bar assembly of the apparatus in accordance with at least some embodiments of the invention.

Referring now to FIG. 13, an exemplary motor assembly 206 for use in driving the drive axle assembly 200 is shown. The motor assembly 206, in particular, is connected at least indirectly to the battery pack 217 and includes a drive motor 206C. The assembly further includes first, second and third motor brackets 206A1, 206A2 and 206A3, respectively, for mounting the drive motor within the motor assembly as well as a gear-head 206B and a precision roller chain sprocket 206D for converting electrical energy from the drive motor to mechanical energy for driving the drive axle assembly 200. In general, a wide variety of gear-heads and sprockets, other than those specifically mentioned above can be used in the present invention. Similarly, the drive motor 206C can be any of a wide variety of electric or electromechanical motors that are known. Additionally, the drive motor 206C can comprise a dual-direction motor capable of moving the apparatus 190 in a wide variety of directions including, for example, up or down a stairwell, or possibly even stopping the apparatus (by virtue of a brake mechanism present in the motor) in a particular position. The motor assembly 206 is mounted to either the left or the right frame members 204 and 205, respectively, via one or more of the motor brackets 206A1-206A3 and the actuation of the drive motor 206C is achieved by way of buttons/switches present on the handlebar assembly 207, described later in the application (FIG. 20).

Figure 14:
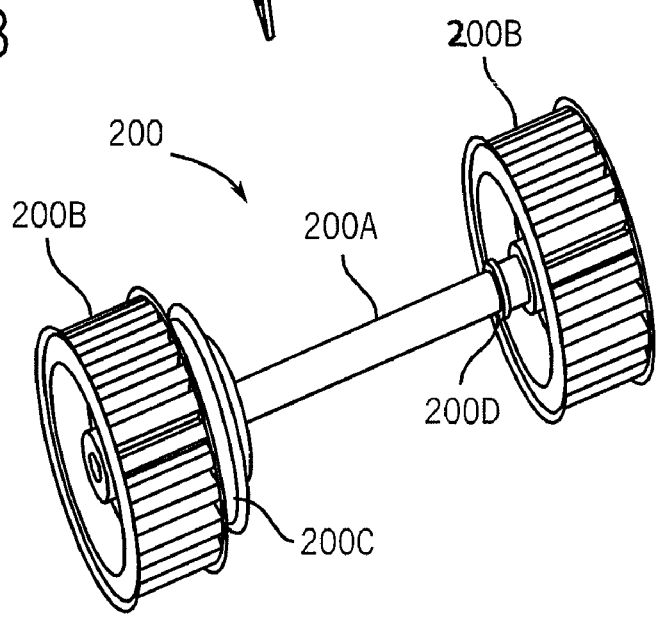
FIG. 14 is a front perspective view of an exemplary drive axle assembly of the apparatus in accordance with at least some embodiments of the invention.

Turning now to FIG. 14, an exemplary drive axle assembly 200 is shown in accordance with at least some embodiments of the present invention. As shown, the drive axle assembly 200 includes: a drive shaft 200A supported on both sides by timing belt pulley mechanisms 200B over which the motorized belts 215 are freely mountable for rotation; a drive gear 200C for rotating the shaft and hence, the timing belt pulley mechanisms 200B; and bushing 200D for reducing wear and tear between the various parts of the drive axle assembly 200. The gear, pulley mechanisms and the bushing can be any of a wide variety of those that are commonly available. For example, an exemplary bushing can comprise OILITE® bushings, available from the McMaster supply company, although other types of bushings are contemplated. The drive gear 200C has mounted thereon a drive chain 214 the other end of which is connected to the motor assembly 206 for providing rotational motion to the drive shaft 200A and the timing belt pulley mechanisms 200B. By virtue of the rotation of the timing belt pulleys, the motorized belts 215 can be rotated. Additionally, the timing belt pulley mechanisms 200B and therefore the motorized belts 215 are capable of rotating in both clockwise and counterclockwise directions. In this fashion, as the motorized belts 215 are rotated, the wheelchair to which the stair assist apparatus is attached can be carried up and/or down the stairs of a stairwell.

Figure 15:
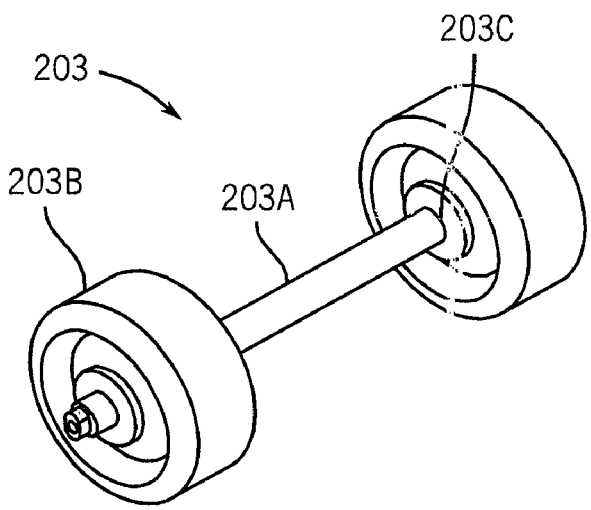
FIG. 15 is a front perspective view of an exemplary roller assembly of the apparatus in accordance with at least some embodiments of the invention.

Turning to FIG. 15, an exemplary roller assembly 203 is shown in accordance with at least some embodiments of the present invention. The roller assembly 203 is attached/connected to the drive axle assembly 200 previously described and the roller assembly 203 provides additional support to maintain the apparatus 190 in an upright position (See FIG. 8) when the apparatus is laid on a flat surface. As shown, the roller assembly 203 includes a set of assist wheels 203B separated by a shaft 203A and held in position by retaining rings 203C. The size of the assist wheels can vary from one embodiment to another. For example, in the present embodiment, a diameter of 3.25 inches is used for each of the wheels 203B. The wheels 203B assist the apparatus in being transported easily from one point to another in an easy and convenient fashion.

Figure 16:
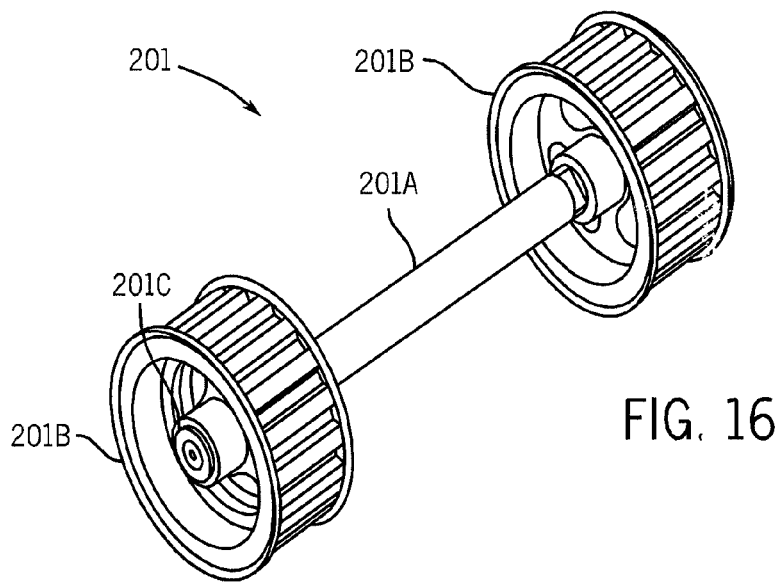
FIG. 16 is a front perspective view of an exemplary idler shaft assembly of the apparatus in accordance with at least some embodiments of the invention.

Referring to FIG. 16, the apparatus 190 (FIG. 8) further includes an idler shaft assembly 201, an exemplary embodiment of which is shown, for maintaining proper alignment and orientation of the drive axle assembly 200. As shown, the idler shaft assembly 201 includes a pair of timing belt pulley mechanisms 201B mounted on an idler pulley shaft 201A. The pulley mechanisms 201B are retained in position, and protected to at least some extent from wear and tear, by way of two sets of bushings 201C, with one bushing being mounted on either side of a respective timing belt pulley mechanism.

Turning back to FIGS. 9, 10, the headrest assembly 209, the handlebar assembly 207, and the drive axle assembly 200 are secured to the left and the right frame members 204 and 205 respectively, by way of a plurality of connecting rods. More specifically, connection is accomplished by smaller first, second and third connecting rods (not specifically numbered), and a larger connecting rod 219. The idler shaft assembly 201, the motor assembly 206 and the battery pack 217 are all also mounted to the left and/or the right frames 204 and 205 by way of mounting brackets, or other fastening means or mechanisms including screws, nuts and bolts. In addition, it is possible that a wide variety of adhesives can be used.

Figure 17A:
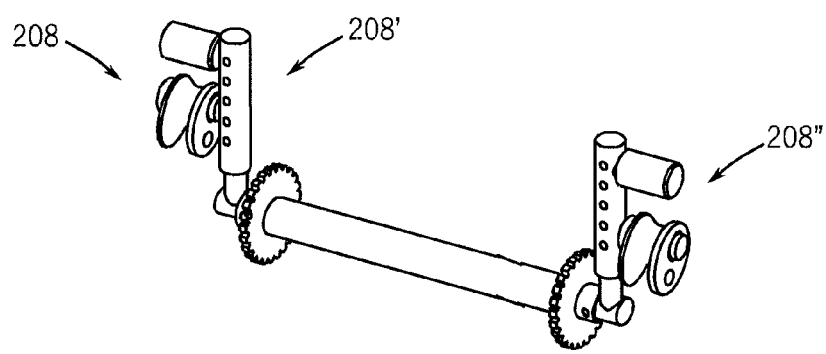
FIGS. 17A-B are side perspective and exploded side perspective views, respectively, of an exemplary top chair attachment assembly of the apparatus in accordance with at least some embodiments of the invention.
Figure 17B:
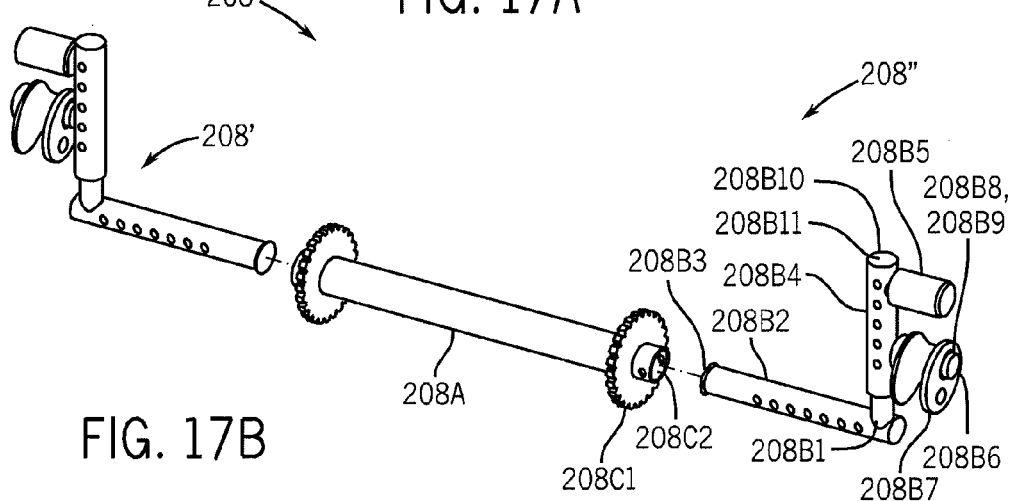

The aforementioned assemblies and sub-assemblies that are mounted to one or more of the respective left and right frame members 204 and 205 are secured to the apparatus housing. The apparatus 190 in turn is attached to the wheelchair 192 by virtue of top and bottom chair attachment assemblies 208 and 210, respectively, described below. Turning now to FIG. 17A-B, an exemplary top chair attachment assembly 208 is shown in accordance with at least some embodiments of the present invention. As shown in FIG. 17A-B, the top chair attachment assembly 208 includes a chair attachment tube 208A mounted adjacent to the handlebar assembly 207. Attachment mechanisms 208' and 208", which are identical or substantially similar, are provided on both ends of the chair attachment tube 208A. For simplicity of description, the attachment mechanism on one side (the right side 208") of the chair attachment tube 208A is described. As shown, a guide tube 208C2 is mounted in mating alignment with and separated by the chair attachment tube 208A by a male disc 208C1. The male disc 208C1 has a plurality of teeth that are capable of engaging the main frame of the wheelchair 192. Also provided is a width adjuster tube 208B2 having a plurality of notches on its surface. The width adjuster tube 208B2 is capable of rotating and sliding in and out of the guide tube 208C2. Rotation is locked when the disc teeth of the male disc 208C1 engage with the main frame. One or more pins (not separately numbered), by virtue of engaging with one or more of the notches (not separately numbered) on the surface of the width adjuster tube 208B2, prevents further sliding motion of the width adjuster tube. Additionally, the width adjuster tube 208B2 is provided by a tube stop 208B3 on the end facing the guide tube 208C2 and a guide rod 208B1 on the opposite end. The tube stop 208B3 provides frictional engagement within the guide tube 208C2.

Still referring to FIG. 17A-B, the guide rod 208B1 is capable of sliding in and out of a height adjuster tube 208B4 for adjusting the height of the apparatus 190 when attached to the wheelchair 192. Similar to the width adjuster tube 208B2, the height adjuster tube 208B4 has a plurality of notches on its surface and tube stop 208B11 on one end. The height adjuster tube is capable of sliding in and out of the guide road 208B1 and being locked by a mechanism, described below, that engages one or more of the notches on the surface of the height adjuster tube 208B4.

Also provided is another attachment tube 208B10 secured to the height adjuster tube 208B4 in the manner shown in FIG. 17A-B. The attachment tube 208B10 has mounted thereon a rubber grip 208B5 for providing a comfortable grip for rotating the width adjuster tube 208B2. Beneath the rubber grip 208B5 is located a CAM disc 208B8 that is attached on one end to the height adjuster mechanism 208B4 and the other end is restrained by way of a flat washer 208B8 and retaining ring 208B9. The CAM disc 208B8 primarily provides a locking mechanism for the height adjuster mechanism 208B4. Notwithstanding, that in the present embodiment components described above have been used, it is nevertheless an intention of this invention to include embodiments, in which alternative mechanisms including, other attachment or engagement means and/or fasteners, capable of providing similar or substantially similar functionality as the components described above, can be used.

Turning now to FIG. 18A-B, an exemplary top chair attachment assembly 210 is shown in at least some embodiments of the present invention. As can be seen, the bottom chair attachment 210 is similar to the top chair attachment 208 having similar components. Also, the left and the right portions 210' and 210", respectively, of the bottom chair attachment are identical or at least substantially similar. However, an extra pivot, for allowing height variations between different types of wheelchair makes and models is provided in the bottom chair attachment 210. As shown, the bottom chair attachment 210 includes a chair attachment tube 210A. With attention to the right side portion of the chair attachment tube 210A, a male disc 210C1 and a guide tube 210C2 are shown. Further, a width adjuster tube 210B1 having a plurality of notches, a tube stop 210B2 on one end and a guide rod 210B3 on the other end of the width adjuster tube, is provided. The width adjuster tube 210B1, as previously mentioned, is capable of rotating and sliding in and out of the guide tube 210C2 until the male disc, 210C1 engages with the main frame of the wheelchair 192. Subsequently, a locking mechanism, such as a pin, can lock the width adjuster tube 210B1 in position.

The guide rod 210B3 is pivotable about the width adjuster tube 210B1 and serves to adjust the height of the apparatus 190 by way of a height adjuster tube 210B4. The height adjuster tube 210B4 has a plurality of notches on its surface and a tube stop 210B5 on one end. Also attached to the height adjuster tube 210B4 is another attachment tube 210B03 to which a metal swivel plate 210B61 is mounted. A rubber grip 210B62 for providing a comfortable grip during rotating the width adjuster tube 210B1 is provided on the metal swivel plate 210B61. A CAM disc 210B65 attached to the metal swivel plate 210B61 by way of a rod 210B64, an e-clip 210B67 and a flat washer 210B66 is provided for adjusting the height of the height adjuster tube. Notwithstanding the previously mentioned components of the bottom chair attachment that are used in the present embodiment, it is nevertheless an intention of this invention to include embodiments, in which alternative mechanisms including, other attachment or engagement means and/or fasteners, capable of providing similar or substantially similar functionality as the components described above, can be used.

Figure 19:
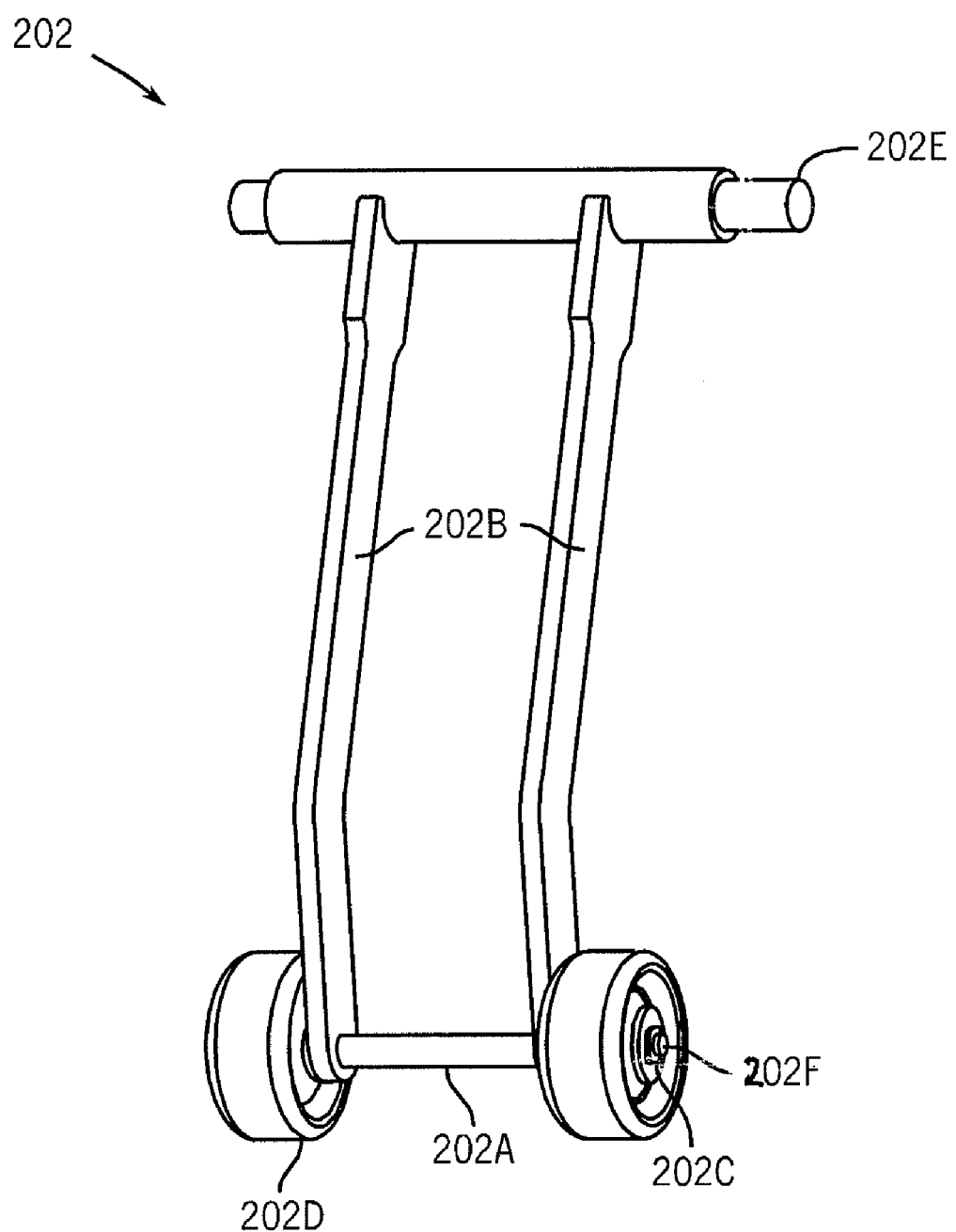
FIG. 19 is a front perspective view of an exemplary assist assembly of the apparatus in accordance with at least some embodiments of the invention.

Referring now to FIG. 19, a rear perspective view of an exemplary assist assembly 202 is shown in accordance with at least some embodiments of the present invention. The assist assembly 202 serves a variety of different purposes. To begin with, the assist assembly 202 can be used to lower the apparatus 190 and/or the wheelchair 192 (having an occupant) to an appropriate angle of the stairs (or any angle that the handler of the wheelchair deems appropriate) for supporting the weight of the apparatus, the wheelchair and the occupant thereof. Such a support mechanism releases the burden off the handler as the handler no longer has to support the occupant to prevent the occupant from falling off. Further, the assist assembly 202 provides support to the wheelchair and the occupant thereof as the apparatus 190 is raised at a vertical angle at the top of the stairs (or at the bottom of the stairs). Additionally, the assist assembly 202 can be used as a "tripod" in tandem with the assist wheels 203B of the roller assembly (described above in regards with FIG. 15) to transport the apparatus 190 to the wheelchair 192 for ease of installation or alternatively from the wheelchair to a storage location.

The assist assembly is generally secured in a stored position in a depression made on the bottom cover 212 (FIG. 10), being actuated to a working position generally during operation of the apparatus 190. The actuation of the assist assembly 202 can be facilitated by way of mechanisms located on the handlebar assembly 207, described below, allowing for a convenient transformation from the stored position to the working position and vice-versa. In particular, the assist assembly 202 includes a first main ratchet or winch system 221 and a secondary smaller ratchet or winch system 222 (See FIG. 10) for controlling the assist assembly during translation from the stored to the working position and vice-versa on actuation of the handlebar assembly 207. Further, the assist assembly 202 can be activated by virtue of the main and the secondary ratchet systems 221 and 222, respectively, at any time (and at any angle) by actuating the handlebar assembly 207. In alternate embodiments, it is contemplated that the number, size and/or type of the ratchet and/or winch system(s) can vary to convenience. Additionally, in alternate embodiments, it is contemplated that fiber-optic, infrared and/or direct wiring can be used to accomplish manipulation of the assist assembly 202 by activating a motor for moving the assist assembly from a stored position to a working position and vice-versa.

As shown in FIG. 19, the assist assembly 202 includes a rod 202E, a pair of support bars 202B, a pair of wheels 202D and an assist rod 202A. The rod 202E in particular is used to attach the assist assembly 202 to the bottom cover 212 of the apparatus 190, for example, by a wide variety of fastening, clamping, snapping and/or other engagement means. The opposing ends of the support bars 202B are secured (potentially equidistant from the ends of the rod 202E) to the rod 202E and to the assist rod 202A. The support bars 202B are additionally capable of pivotal motion about the rod 202E. By virtue of such a pivotal motion, with the aid of the ratchet systems 221 and 222, the support bars 202B allow the wheels 202D to transform from the stored position to the working position (See FIG. 9) and vice-versa. Additionally, the support bars 202B are shaped appropriately with a slight curvature to provide stability to the apparatus 190 while bearing the weight of the apparatus during operation.

Further, the assist rod 202A is attached on both sides to the wheels 202D that in particular are held in position on the assist rod by way of a pair of retaining ring mechanisms 202F and a pair of bearing mechanisms 202C (e.g., bronze bearings). In other embodiments, other retaining means including bolts, fastening clips, etc., can be used, and the size of the wheel can vary in different embodiments. For example, in the present embodiment, wheels having a diameter of 3.25 inches are used. Nonetheless, in other embodiments wheels of different sizes depending upon the type of wheelchair can be used in conjunction with the apparatus 190.

Referring now to FIG. 20 a side perspective view of an exemplary handlebar assembly 207 is shown in accordance with at least some embodiments of the present invention. The handlebar assembly 207 is used for manipulating the apparatus 190 up and down stairs (either alone or with the wheelchair) as well as for controlling the motor assembly 206 and the assist assembly 202. The handlebar assembly is secured to the left and the right frame members 204 and 205, respectively, by way of the smaller connecting rods, which are held in place by a pair of pipe brackets 207R. Further, the handlebar assembly 207 includes a handlebar frame 207A that includes a generally U-shaped channel or channel portion 207A1 with abutting side walls 207A2 and 207A3. A telescoping tube 207D slides into (or out of) the handlebar frame 207A, and this motion is restricted or constrained by a stop plate 207T, which is located, as shown, on one end of the handlebar frame. As such, the tube 207D can be characterized as a telescoping, and adjustable and/or pivotable and capable of telescopic movement for navigating and manipulating the apparatus 190. To ensure length adjustability, the handlebar assembly 207 is first extended from its stored position within the left and the right frame members, 204 and 205, respectively, to achieve the telescopic movement of the telescoping tube 207D.

Additionally, there exists on the handlebar frame 207A a quick release mechanism (such as a quick pin) 207Q that releases the telescoping tube 207D from a stored position enabling the telescoping tube to be pulled up into a working position. As the telescoping tube 2071) is pulled out of the handlebar frame 207A, the telescoping tube is constrained from falling off from the handlebar frame by virtue of the quick release mechanism 207Q. The quick release mechanism 207Q further serves to engage the third rod portion 207C, or alternatively the middle rod portion 207D1 (e.g., by way of micro adjustments present on the surface) securely in position during the manipulation or transportation of the apparatus 190. Notwithstanding the fact that in the present embodiment a quick release mechanism is used to engage the telescoping tube 207D to the handlebar frame 207A, in other embodiments other clamping or connecting means or mechanisms including plugs, nuts, screws, air pistons etc., can be used.

For achieving the telescopic movement, the telescoping tube 207D is further divided into multiple sub-portions including a first rod portion 207G, a middle rod portion 207D1 and a third rod portion 207C that is connected to the middle rod portion by an outer pipe 207F. In particular, the telescoping movement is achieved by virtue of the outer pipe 207F, which is defined by a plug and/or hinge 207E and/or allows the middle rod portion 207D1 to pivot about the outer pipe for maximum flexibility in navigating the apparatus 190. Advantageously, the middle rod portion 207D1 can be pivoted in either longitudinal direction or in a latitudinal direction. The longitudinal direction of movement includes motion from a completely retracted position that is perpendicular to the third rod portion 207C to a position that is in axial alignment) (180°) with the third rod portion. Alternatively, a latitudinal direction of movement can be achieved by pivoting the middle rod portion in an angular orientation to the third rod portion. The telescopic position of the telescoping tube 207D is dependent upon the position of the apparatus 190 on the stairs. Although an outer pipe is used to connect the middle rod portion 207D to the third rod portion 207C in the present embodiment, other fastening or connecting means and/or mechanisms that provide for pivotal movement are contemplated.

Still referring to FIG. 20, the middle rod portion 207D1 is a hollow tube into which the first rod portion 207A can slide for easy storage. To this end, the first rod portion 207A has a plurality of protrusions (or holes) each of which can be frictionally engaged by one or more holding tabs 207S and handle bar stops 207H present on the middle rod portion 207D1. Therefore, by virtue of the first rod portion 207G being capable of sliding in/out of the middle rod portion 207D1 and the middle rod portion being capable of sliding in/out of the handlebar frame 207A, the telescoping tube 207D can be conveniently stored during non-operation of the apparatus 190. Such a storage mechanism further prevents any damage to the telescoping tube 207D.

Generally, in the present embodiment, each of the rod portions 207G, 207D1 and 207C, respectively, are hollow, substantially rectangularly-shaped rods, that provide for an apparatus that is light-weight (and yet strong) and easy to handle. Nevertheless, in other embodiments one or more of the first, middle and third rod portions 207G, 207D1 and 207C, respectively, can take the form of solid rods with the rod portions folding with respect to one another. Additionally, each of the rod portions can be made of a wide variety of materials including, for example, plastic, metal, or other rigid or semi-rigid material. Also, one or more of the rods can be of shapes other than rectangular including, for example, cylindrical and hexagonal or the like.

The middle rod portion 207D1 of the telescoping tube 207D includes bushings (e.g, nylon bushings) that are pressed or otherwise secured thereon to protect or substantially protect the telescoping tube from dirt and damage. Additionally, such bushings provide a smooth telescoping operation in the various directions. Additionally, the edge of the third rod portion 207C is protected by a cap 207I (e.g. a nylon cap). The presence of the cap 207I prevents or substantially prevents any dust, debris or other particles from entering and blocking the telescoping tube 207D and protect a user from any exposed sharp edges. Additionally, the edges of the outerpipe 207F (within the middle and the third rod portions) can be covered by a cap 207J (e.g., a nylon cap). Although a nylon cap is disclosed and used in the present embodiment, other covers and/or caps of other types and/or made of other materials including plastic, metal or other rigid and semi-rigid material can potentially be used in other embodiments.

Still referring to FIG. 20, in addition to the various portions of the telescoping tube 207D that afford flexibility and navigational convenience, the handlebar assembly 207 is also equipped with a handlebar 207K that enables manipulation of the apparatus 190. In alternate embodiments, the manipulative capabilities of the handlebar 207K can be accomplished fiber-optic, infra-red, or direct wiring. As shown, the handlebar 207K includes a pair of opposing handlebar grips 207L for grasping the handlebar 207K for convenient navigational facility. Each of the handlebar grips 207L serve additional purposes as well. For example, by depressing the right handlebar grip, the telescopic movement of the telescoping tube 207D can be manipulated in the longitudinal direction, including extension (aligned with the third rod portion 207C) and contraction (perpendicular to the third rod portion), during operation of the apparatus 190. Similarly, by depressing the left handlebar grip, the assist assembly 202 can be stored back (e.g., by releasing the main and the secondary ratchet systems, 221 and 222, respectively) into the bottom cover 212, thereby moving from a working position to a stored position. Alternatively, the assist assembly 202 can be manually operated by hand and/or foot to store the assist assembly back into the stored position. Also provided on the handlebar 207K are a pair of opposing handles 207M that serve different purposes. For example, depression of the right handle adjusts the telescopic angle (latitudinal motion) of the telescoping tube 207D depending upon the position of the apparatus 190 on the stairwell while depression of the left handle serves to release the assist assembly 202 (e.g., by releasing the main and the secondary ratchet systems, 221 and 222, respectively) from the stored position to the working position on the floor. Typically, the assist assembly 202 will continue to fall on actuation of at least one of the handles 207M (e.g., the left handle) until the assist assembly either contacts the ground, or in the alternative, at least one of the handles (e.g., the left handle) is released.

The handlebar 207K further includes various buttons for determining the direction of movement of the wheelchair to which the apparatus 190 is connected. In particular, the wheelchair can be manipulated using the apparatus to move up or down a stairway by pressing the appropriate buttons. For example, by depressing and holding an "up" button 207N, the apparatus 190 can be programmed to move the wheelchair up the stairs by setting the motorized belts 215 to rotate in a clockwise direction. Similarly, by depressing and holding a "down" button 207O, the wheelchair 192 can be programmed to move downwards on a stairwell by setting the motorized belts 215 to rotate in a counter clockwise direction. To ensure safety of the wheelchair occupant, the apparatus 190 is equipped with an auto-stop feature. By virtue of the auto-stop feature, the default mode of the wheelchair to which the apparatus 190 is attached is a STOP/HALT mode. Therefore, the wheelchair is capable of moving insofar that at least one of the buttons (e.g., Up or DOWN) is depressed. On releasing the button, the wheelchair automatically comes to a halt. The wheelchair is capable of halting even on a stairway. The halting mechanism is achieved by way of a motor brake (not shown) that is built in the motor assembly 206. In at least some other embodiments, other mechanisms including sensors (e.g., touch sensors) can be used to detect when the handlebar 207 is not being handled (e.g., by not sensing a handler's hand on the handlebar 207K) to automatically trigger the auto-stop mechanism for halting the wheelchair. In alternate embodiments, the handlebar grips 207L, and handles 207M can be programmed such that holding and rotating one or more of the handles and the handlebar grips causes acceleration and retardation of the wheelchair going up and/or down the stairs while releasing the handles and the handlebar grips causes the apparatus (and hence, the wheelchair) to come to a halt. In yet other embodiments, mechanisms other than those described above can be used to achieve the functionality of the handlebar 207K described above. Additionally, the handlebar 207K is equipped with a power button 207P that can be used to turn on/off the apparatus 190 thereby preventing the battery from being drained when not in use. Typically, the power button 207P will be illuminated when the apparatus 190 is powered up.

Figure 21:
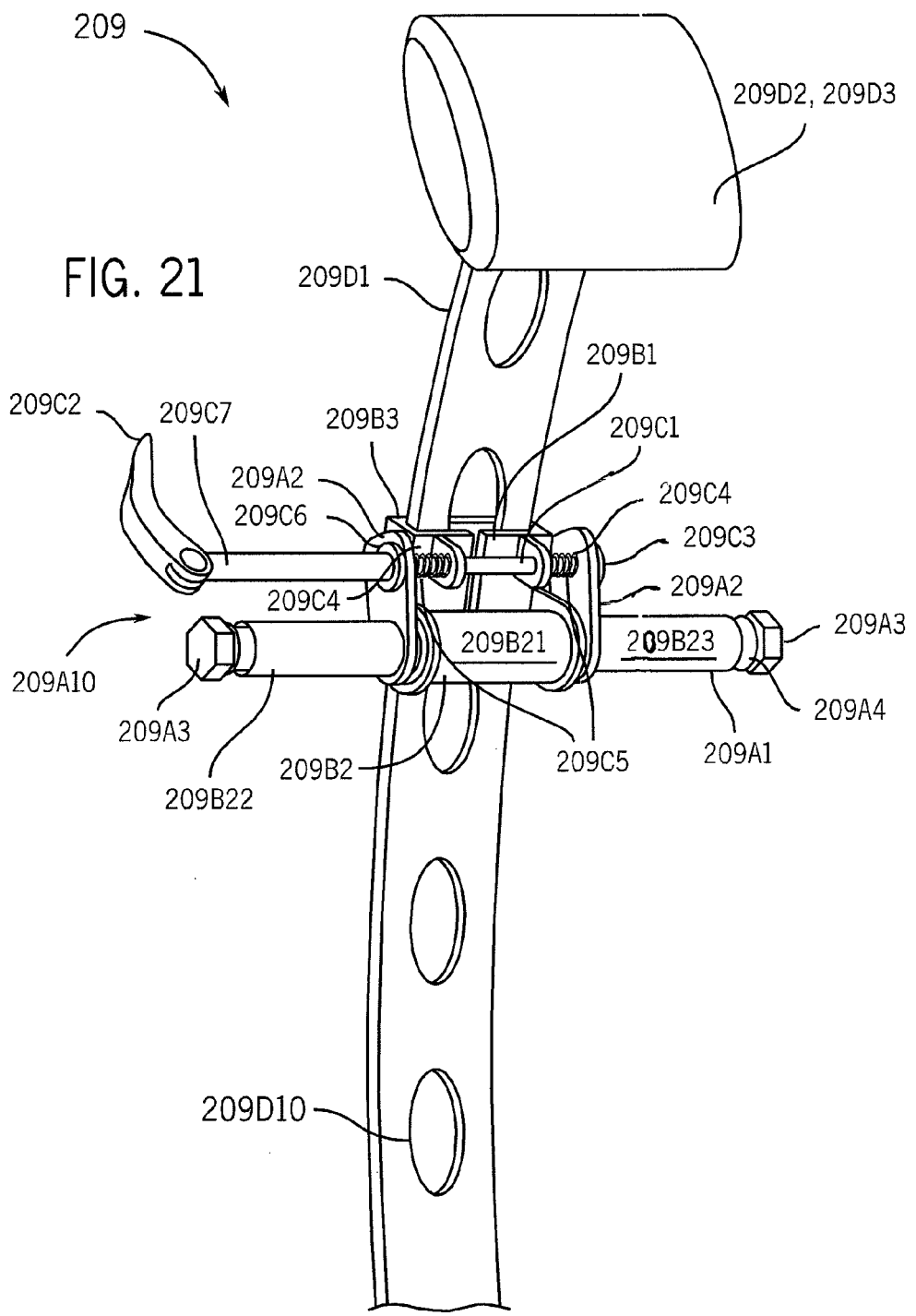
FIG. 21 is a front perspective view of an exemplary headrest assembly of the apparatus in accordance with at least some embodiments of the invention.

Referring now to FIG. 21, a side perspective view of an exemplary headrest assembly 209 is shown in accordance with at least some embodiments of the present invention. The headrest assembly 209 in particular provides support to the head of the occupant of the wheelchair during ascending/descending the stairwell. As shown, the headrest assembly 209 includes a headrest bar 209D1, a head support 209D2 and an adjustment assembly 209A10. The headrest bar 209D1 in particular is a narrow, slightly curved bar terminating on the head support 209D2 on one end. The other end of the headrest bar 209D1 is connected to one or more of the smaller connecting rods (see FIG. 10) for attaching the headrest assembly 209 to the respective left and the right frame members 204 and 205 of the apparatus housing. Notwithstanding the fact that the headrest assembly in the present embodiment is connected to the apparatus housing, it is nevertheless an intention of this invention to include embodiments in which the headrest assembly is connected to the handlebar assembly, or possibly even the drive mechanism.

Further still, the headrest bar 2091D1 has formed thereon a plurality of notches 209D10, which can be used to adjust the height of the headrest assembly 209 as desired by virtue of the adjustment assembly 209A10, described below. The head support 209D2 provides a firm yet cushion-like surface to rest the head during operation of the apparatus 190. In the present embodiment, the head support 209D2 includes a foam core 209D3 strengthened by a mesh like material (not shown). In alternate embodiments other head supports that are commonly available and/or frequently used can be used in other embodiments. The shape and size of the head support 209D2 can vary to convenience.

The adjustment assembly 209A10 attached at least indirectly to the headrest bar 209D1, enables adjustment of the height of the head support 209D2 while providing additional support to the headrest bar 209D1. As shown, the adjustment assembly 209A10 includes a compression frame 209B1, a CAM lever 209C2 and a support sleeve 209B2 connected together in operational association with one another. In particular, the compression frame 209B1 is a substantially C-shaped structure surrounding the headrest bar 209D1 and into which the headrest bar slides for engaging one of the notches 209D10. The compression frame 209B1 also has attached thereto the CAM lever 209C2, actuation of which releases the headrest assembly 209 from its stored position allowing the headrest bar 209D1 to be pulled up to a desired height. The CAM lever 209C2 also has mounted thereon, adjacent to the headrest bar 209D1, a pair of headrest rotation keys 209A2 held apart from each other by way of a tension rod 209C1, a pair of compression springs 209C5 and retaining rings 209C4. The rotation keys 209A2 are also secured on the sides facing the CAM lever 209C2 by way of CAM nuts 209C6.

Additionally, each of the rotation keys engage the support sleeve 209B2 for rotational movement. The support sleeve 209B2 provides additional support to the CAM lever 209C2 and is frictionally engaged to the rotation keys 209A2. As shown, the support sleeve 209B2 is divided into a central sleeve 20921 and abutting side portions 209B22 and 209B23 respectively. Each of the respective side portions 209B22 and 209B23 are further restrained by way of bolts 209A3 and retaining rings 209A4. A wide variety of bolts and retaining rings including for example, HHBolt 0.5000 and LW 0.6 can be used. In other embodiments, bolts and retaining rings other than those mentioned above can also be used. In operation, the actuation of the CAM lever 209C2 causes the rotation keys 209A2 to rotate thereby pulling the compression frame 209B1 away from the headrest bar 209D1 and enabling upward movement of the headrest bar.

Notwithstanding the above-described embodiments of FIGS. 1-21, the present invention is intended to encompass a variety of other arrangements of the apparatus 190 and the assemblies thereof. It is contemplated that the present invention be used for different types of stairs made of or covered by a variety of materials including for example, wood, tile, carpet and possibly even metal. Additionally, the present invention can be used for convenient and steady movement over a wide variety of surfaces that are difficult to tread in a wheelchair including, for example, carpet, wood, stone, tile and metal.

The present invention relates to a variety of embodiments including additions anti/or refinements to the various features of the apparatus described above, the various assemblies including the body, headrest, assist and the handlebar assemblies and sub-assemblies thereof. The shape, size, material and orientation of the various features can vary from one embodiment to another. For example, although the FIGS. 1-21 illustrate an apparatus for use with a wheelchair, it is nevertheless contemplated that the present invention encompass and include embodiments enabling the apparatus to be used in conjunction with an upright stretcher or a folding chair for ascending/descending the stairs. Additional safety straps for securing the occupant of the wheelchair can also be provided. The shape, size, type and material of the various mechanical components including nuts, bolts, pins and other fastening means can vary to convenience. Embodiments of the present invention can be particularly beneficial insofar as they provide a cost effective, convenient and safe mode of transportation from one point to another.

Thus, it is seen that a means has been provided by which a standard wheelchair may be modified, or manufactured, with an apparatus that will allow an occupant of the chair, with a handler, to ascend or descend a stairway with a minimum of inconvenience or bumps. It is felt that the invention is of such a nature that it would be affordable by the average wheelchair occupant and by nursing homes and hospitals to assist in moving patients from one floor to another on a stairway. Further, the subject invention will provide means by which handicapped and invalid patients may be efficiently and safely removed from a multi-story building down a stairway in the event of a fire or other hazard. The subject invention may be practiced by a single handler of a wheelchair and occupant on a stairway, if necessary, in an emergency.

Although the present invention is intended to be highly reliable, all physical systems are susceptible to failure and provision must be made for such failure. Accordingly, it is understood that safety, in an industrial process, depends on a wide variety of factors outside of the scope of the present invention including, for example, design of the system; installation and maintenance of the components of the system; the cooperation and training of individuals using the system; and consideration of the failure modes of the other components being utilized. No representation is made herein that the present invention in its various embodiments will make any use or process safe, and no recommendation is made herein to utilize one preferred embodiment over, or to the exclusion of another. Rather, the invention results in various advantages not achieved by prior solutions.

It is specifically intended that the present invention not be limited to the embodiments and illustrations contained herein, but include modified forms of those embodiments including portions of the embodiments and combinations of elements of different embodiments as come within the scope of the following claims. More generally, while the present invention has been shown and described in terms of various embodiments, including at least one preferred embodiment, it is recognized that equivalents, alternatives, and modifications, aside from those expressly stated, are possible and considered to be within the scope of the appending claims.

We claim:

1. An apparatus capable of assisting a wheelchair and an occupant thereof to ascend or descend a stairway or stairway-like structure, the apparatus comprising:
    a pair of connected frame members, each of the frame members including one or more belt guides for mounting and guiding a motorized belt that is further spaced or positioned around the respective frame member;
    a drive assembly connected at least indirectly to the pair of frame members for driving movement of the motorized belts around the frame members;
    a head-rest assembly connected at least indirectly to the pair of frame members;
    a handle-bar assembly connected at least indirectly to the pair of frame members;
    an assist assembly connected at least indirectly to the pair of frame members;
    a housing at least partially storing the motorized belts and the frame members, the housing including a top cover and a bottom cover, the bottom cover having a depression therein for storing at least a portion of the assist assembly;
    a roller assembly extending from the housing; and
    one or more wheelchair attachment assemblies connected at least indirectly to the pair of frame members;
    wherein the assist assembly is operable to:
        a) provide, in tandem with the roller assembly, an apparatus support arrangement;
        b) at least partially support the wheelchair and any occupant thereof as the wheelchair and any occupant are tilted backwardly and/or otherwise lowered until at least one of the belts engages or otherwise interacts with the stair steps or stair step-like structures of the stairway or stairway-like structure; and
        c) deploy from a storage position in which the assist assembly is at least partially stored with respect to the housing in the depression to a working position in which the assist assembly extends from the depression of the housing.

2. The apparatus of claim 1, wherein the headrest assembly is at least one of adjustable and pivotable.

3. The apparatus of claim 2 wherein the head-rest assembly further comprises:
    at least one shaft having a plurality of notches;
    a head support connected at least indirectly to the at least one shaft for providing support to the head of the occupant of the wheelchair; and
    an adjustment mechanism for adjusting the height of the at least one shaft by engaging with at least one of the plurality of notches on the at least one shaft.

4. The apparatus of claim 1, wherein the handle bar assembly includes at least one tube that is at least one of adjustable and pivotable such that the handle-bar assembly is capable of telescopic movement.

5. The apparatus of claim 4, wherein the handle-bar assembly further comprises:
    at least one handlebar frame, the at least one tube capable of sliding within the at least one handlebar frame, the at least one tube further comprising first, second and third portions, the first portion capable of sliding with the second portion and the second portion capable of telescopic movement about the third portion; and
    a handlebar connected at least indirectly to the first portion for manipulating one or more of the pair of connected frame members, the assist assembly and the head-rest assembly.

6. The apparatus of claim 5, wherein the handle-bar further includes (i) first and second handle grips; (ii) first and second handle-bars; and (iii) a plurality of buttons.

7. The apparatus of claim 1, further comprising an idler shaft assembly, the idler shaft assembly having (i) at least one shaft; and (ii) first and second wheels rotatably mounted at opposing ends of the at least one shaft.

8. The apparatus of claim 1, wherein the drive assembly further comprises:
    a motor assembly; and
    a drive axle assembly connected at least indirectly to the motor assembly.

9. The apparatus of claim 8, wherein the motor assembly further comprises:
    a drive motor; and
    at least one battery connected at least indirectly to the drive motor for providing power to the drive motor.

10. The apparatus of claim 8, wherein the drive axle assembly further comprises:
    at least one shaft;
    wherein at least one of the motorized belts is connected at least indirectly to the at least one shaft, and is operable to be driven by the motor assembly.

11. The apparatus of claim 10, wherein the at least one of the motorized belts is connected to the at least one shaft by way of a motorized wheel.

12. The apparatus of claim 11, wherein the motorized wheel is a gear or a pulley.

13. The apparatus of claim 1, wherein the handle bar assembly is used to actuate the assist assembly from the storage position to the working position and from the working position to the storage position.

14. The apparatus of claim 1, wherein the roller assembly is capable of providing support to the apparatus so that the apparatus maintains a stable and/or upright position as the apparatus is transported and/or mounted to and/or from the wheelchair.

15. The apparatus of claim 1, wherein the assist assembly is operable to provide pivotal movement to permit the assist assembly to pivot at least with respect to at least one of the pair of frame members to move from the storage position to the working position and from the working position to the storage position.

* * * * *

UNITED STATES PATENT AND TRADEMARK OFFICE
CERTIFICATE OF CORRECTION

| | | |
|---|---|---|
| PATENT NO. | : 8,333,389 B2 | Page 1 of 1 |
| APPLICATION NO. | : 13/170416 | |
| DATED | : December 18, 2012 | |
| INVENTOR(S) | : Steven Rembos et al. | |

It is certified that error appears in the above-identified patent and that said Letters Patent is hereby corrected as shown below:

Column 1, line 26: Delete "hump" and insert --bump--
Column 4, line 12: Delete "7h" and insert --7b--
Column 7, line 52: Delete "sonic" and insert --some--
Column 9, line 10: Delete "hushing" and insert --bushing--
Column 12, line 66: Delete "2071" and insert --207D--
Column 15, line 41: Delete "2091D1" and insert --209D1--
Column 16, line 11: Delete "20921" and insert --209B21--
Column 16, line 33: Delete "anti/or" and insert --and/or--

Signed and Sealed this
Ninth Day of April, 2013

Teresa Stanek Rea
*Acting Director of the United States Patent and Trademark Office*